(12) United States Patent
Acampora

(10) Patent No.: US 8,855,143 B1
(45) Date of Patent: Oct. 7, 2014

(54) BANDWIDTH SAVING SYSTEM AND METHOD FOR COMMUNICATING SELF DESCRIBING MESSAGES OVER A NETWORK

(76) Inventor: Joseph Acampora, Mount Vernon, NY (US)

(*) Notice: Subject to any disclaimer, the term of this patent is extended or adjusted under 35 U.S.C. 154(b) by 1796 days.

(21) Appl. No.: 11/408,448

(22) Filed: Apr. 21, 2006

Related U.S. Application Data

(60) Provisional application No. 60/673,067, filed on Apr. 21, 2005.

(51) Int. Cl.
*H04J 3/18* (2006.01)
(52) U.S. Cl.
USPC .......................................... 370/477; 709/236
(58) Field of Classification Search
USPC .......... 370/477, 468, 252; 709/247, 236, 237; 708/203; 707/693
See application file for complete search history.

(56) References Cited

U.S. PATENT DOCUMENTS

| | | | | |
|---|---|---|---|---|
| 5,049,881 | A * | 9/1991 | Gibson et al. | 341/95 |
| 6,963,570 | B1 * | 11/2005 | Agarwal | 370/395.32 |
| 7,197,622 | B2 * | 3/2007 | Torkelsson et al. | 711/216 |
| 7,720,071 | B2 * | 5/2010 | Wu et al. | 370/392 |
| 2002/0032880 | A1 * | 3/2002 | Poletto et al. | 714/4 |
| 2005/0256974 | A1 * | 11/2005 | Teodosiu et al. | 709/247 |
| 2006/0036755 | A1 * | 2/2006 | Abdullah et al. | 709/230 |

OTHER PUBLICATIONS

"Cooperating Security Managers: A Peer-Based Intrusion Detection System", IEEE Network, 1996, G. B. White, E. A. Fisch, U. W. Pooch, URL: http://ieeexplore.ieee.org/xpl/freeabs_all.jsp?arnumber=484228, Pages Referenced: #22.

Architecture for Intrusion Detection Using Autonomous Agents, IEEE, 1998, J.S. Balasubramaniyan, J.O. Garcia-Fernandez, D. Isacoff, E. Spafford, and D. Zamboni, Proceedings of the 14th IEEE Computer Security Applications Conference, URL: http://www.computer.org/portal/web/csdl/abs/proceedings/acsac/1998/8789/00/87890013abs.htm.

(Continued)

*Primary Examiner* — Kerri Rose
(74) *Attorney, Agent, or Firm* — Anthony J. Oliveto, Esq.

(57) ABSTRACT

The enclosed system and method provides a means by which metadata-encoded or otherwise self-describing messages can be communicated, stored or otherwise utilized at a greatly reduced message size. This is accomplished for a given message through decomposing it into message metadata and message data, using a hash of the message metadata along with the message data to represent the message while in its decomposed form absent of original message metadata, and subsequently recomposing the message from the message metadata and message data using the hash as a reference. The method disclosed herein exploits detected repetition of sets of metadata, deriving benefit each time a hash is communicated, stored or otherwise used in lieu of a set of metadata, the hash being smaller in size than the set of metadata itself.

24 Claims, 33 Drawing Sheets

Flowchart for Message Decompose in a Send/Store, Multiuse Method Embodiment

(56) References Cited

OTHER PUBLICATIONS

"EMERALD; event monitoring enabling responses to anomalous live disturbances.", SRI International, 1996, P. Porras, P. Neumann, Proceedings of the 20th National Information Systems Security Conference, Pages Referenced: #5.

"The Intrusion Detection Exchange Format", IETF, 2004, H. Debar, D. Curry, B. Feinstein, URL: http://www.ietf.org/rfc/rfc4765.txt.

"The MD5 Message-Digest Algorithm" (RFC 1321), IETF, 1992, R. Rivest, Pages Referenced: #0 Executive Summary, #1.

"A Taxonomy of DDoS Attack and DDoS Defense Mechanisms", ACM, 2004, J. Mirkovic, P. Reihner, ACM SIGCOMM Computer Communications Review, Pages Referenced: #50.

"Characterization of Defense Mechanisms against Distributed Denial of Service Attacks", Computers & Security, 2004, L. Chen, T. Longstaff, K. Carley, vol. 23. No. 8, pp. 865-678, Pages Referenced: #22-#23.

"Indra: A peer-to-peer approach to network intrusion detection and prevention", IEEE, 2003, R. Janakiraman, M. Waldvogel, Q. Zhang, Proceedings of the IEEE Twelfth International Workshop on Enabling Technologies: Infrastructure for Collaborative Enterprises, pp. 226, Linz, Austria.

"The Intrusion Detection Exchange Protocol" (IDXP), IETF, 2002, B. Feinstein, G. Matthews, J. White, IETF Internet Drafts, Pages Referenced: #0 Abstract.

"The Blocks Extensible Exchange Protocol Core", IETF, 2001, M. Rose, IETF RFC3080 Draft Standard, URL: http://tools.ietf.org/html/rfc3080.

"Web Services' Minority Report", Network Magazine, 2005, D. Greenfield, Network Magazine, 30-43. US.

"zlib software library", gzip.org, URL: http://www.gzip.org/zlib, Pages Referenced: #1, Jul. 2001.

"SNORT TM software", SourceFire, URL: http://SNORT.org, Pages Referenced: #1, Aug. 2000.

"SNORT TM IDMEF Plug-in software", URL: http://sourceforge.net/projects/SNORT TM-idmef/, Pages Referenced: #1, Oct. 2000.

"Libxml2 software library", URL: http://www.xmisoft.org, Pages Referenced: #1, Mar. 2000.

"OpenSSL software library", URL: http://www.openssl.org/, Pages Referenced: #1, Jan. 1999.

"Nmap software", URL: http://www.insecure.org/nmap, Pages Referenced: #1, Dec. 1998.

"Gnu C library—21.3.1 CPU Time Inquiry", URL: http://www.gnu.org/software/libc/manual/html_node/CPU-Time.html#CPU—, Pages Referenced: #1, Jan. 2004.

"Worm_Sasser.A", Trend Micro, URL: http://www.trendmicro.com/vinfo/virusencyclo/default5.asp?VName=WORM%5FSASSER%2EA&VSect=T, Pages Referenced: #1, #3, Jul. 2002.

"Mostly Harmless", Virus Bulletin, 2004, UK, URL: http://www.virusbtn.com/magazine/issues/pdf/2004/200408.pdf, Pages Referenced: #5, #6.

"A Comparison Study of Three Worm Families and Their Propagation in a Network", Securfity Focus, 2004, D. Hanson, B. Kostanecki, R. Jagodzinski, J. Miller, Website, URL: http://www.securityfocus.com/infocus/1752 (* No longer available *).

"XMill: an Efficient Compressor for XML Data", ACM, 2000, H. Liefke, D. Suciu, Dallas, TX USA, Pages Referenced: #154, #161.

"XML-DNR: A Bandwidth-Saving Technique for Distributed Intrusion Detection Systems", U.S. Deparstment of Energy, 2005, J. Acampora, URL: http://cybertrain.labworks.org/conference/april2005/Acampora_Joseph_XMLDNR.pdf, Pages Referenced: #2.

"Collaborating Against Common Enemies", ACM, Internet Measurement Conference 2005, California, USA, 2005, S. Katti, B. Krishnamurthy, D. Katabi, URL: http://public.research.att.com/~bala/papers/common.pdf, Pages Referenced: #13.

* cited by examiner

FIGURE 1(a). Flowchart for Message Decompose in a Send/Store, Multiuse Method Embodiment
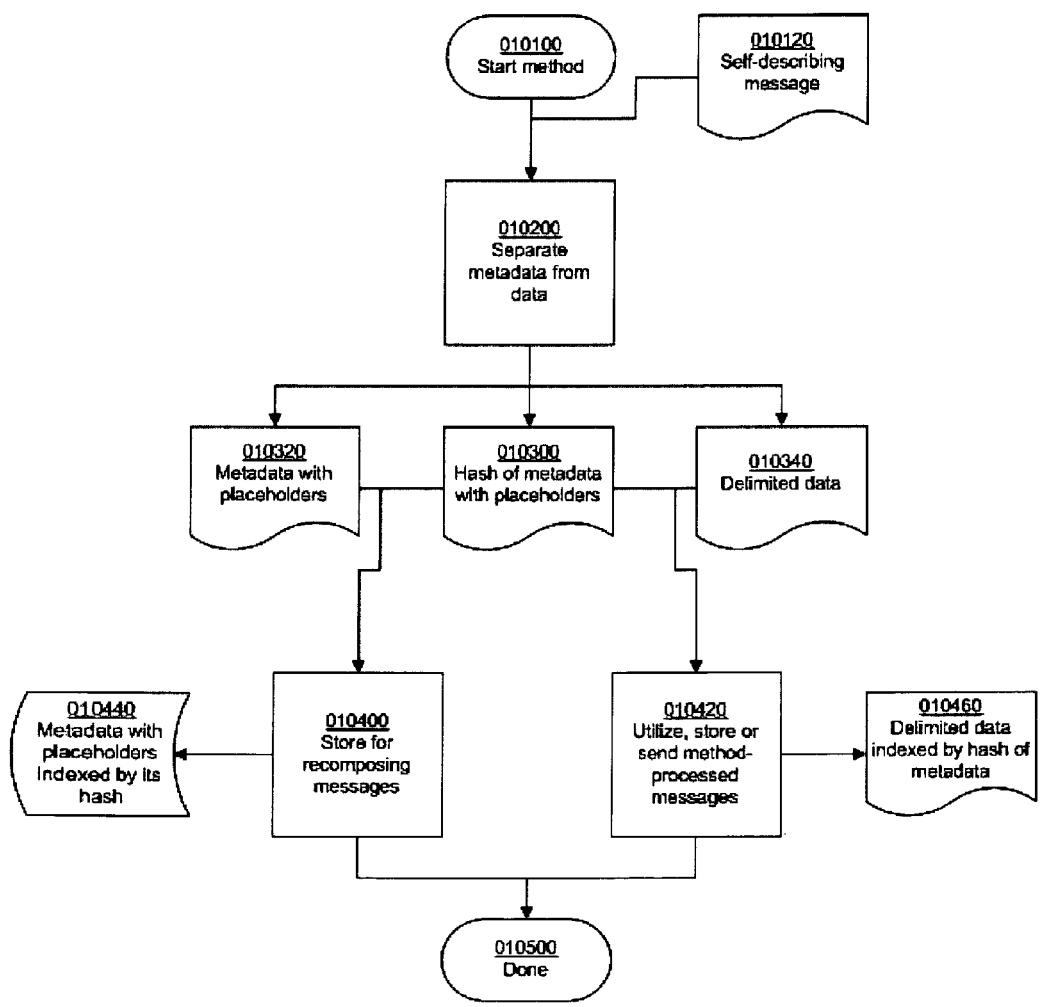

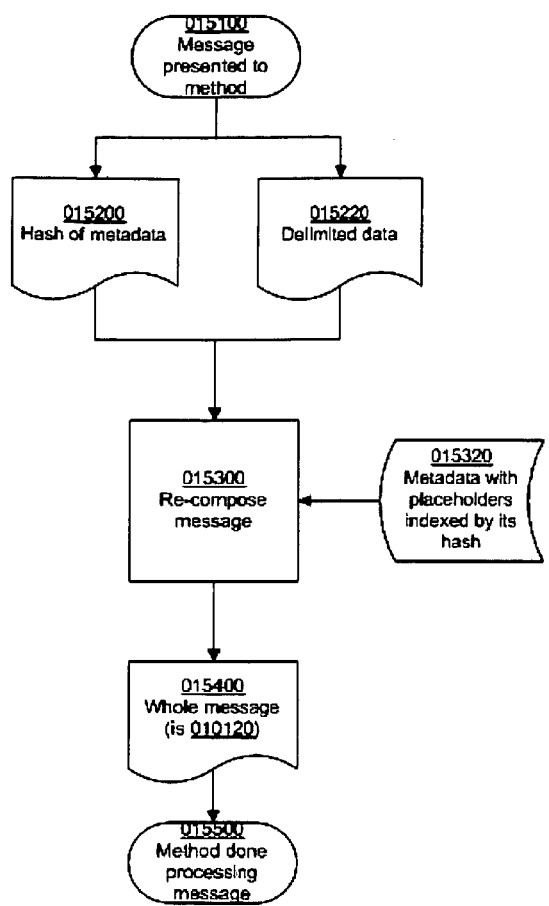
FIGURE 1(b). Flowchart for Message Recompose in a Multiuse Method Embodiment

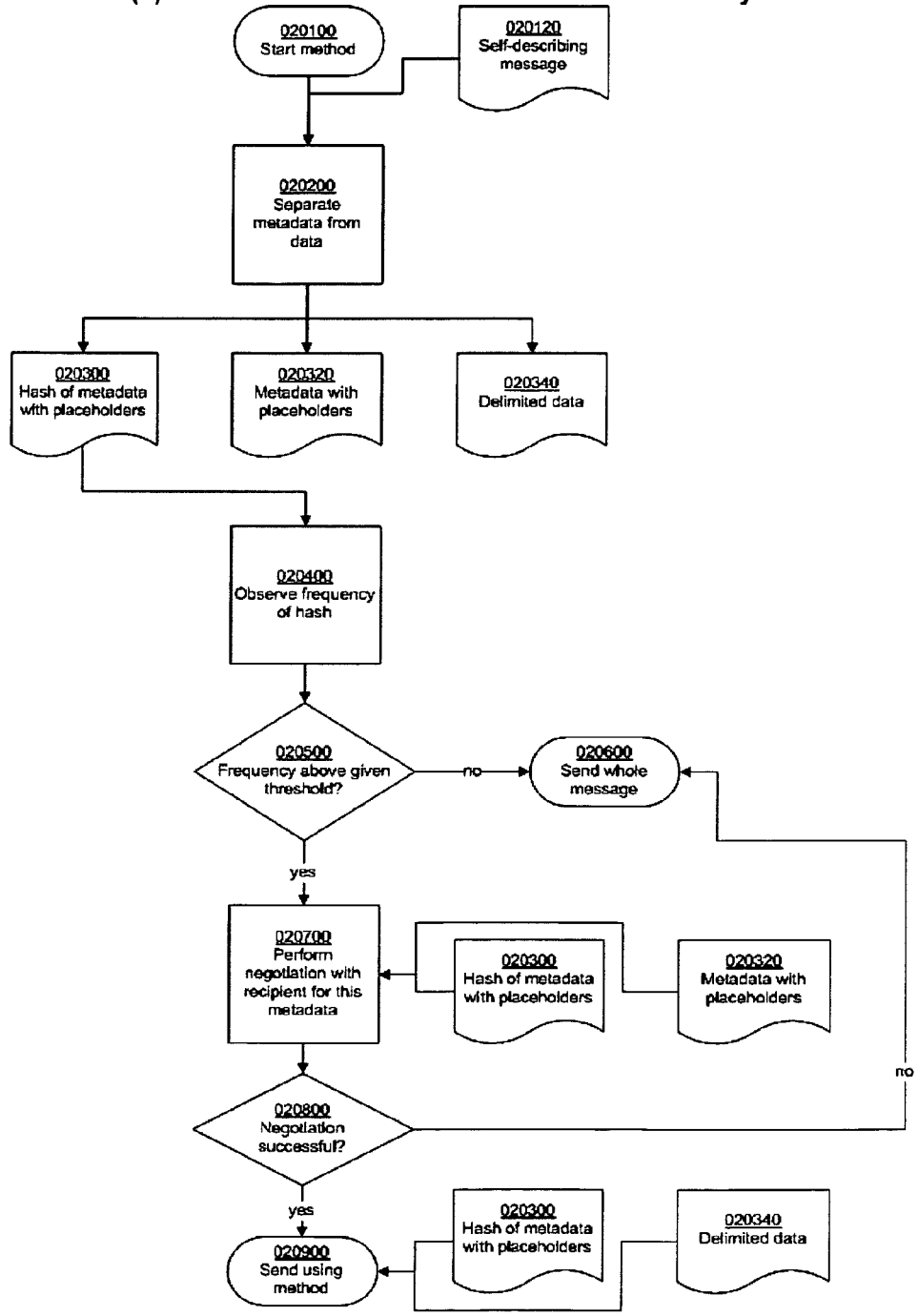

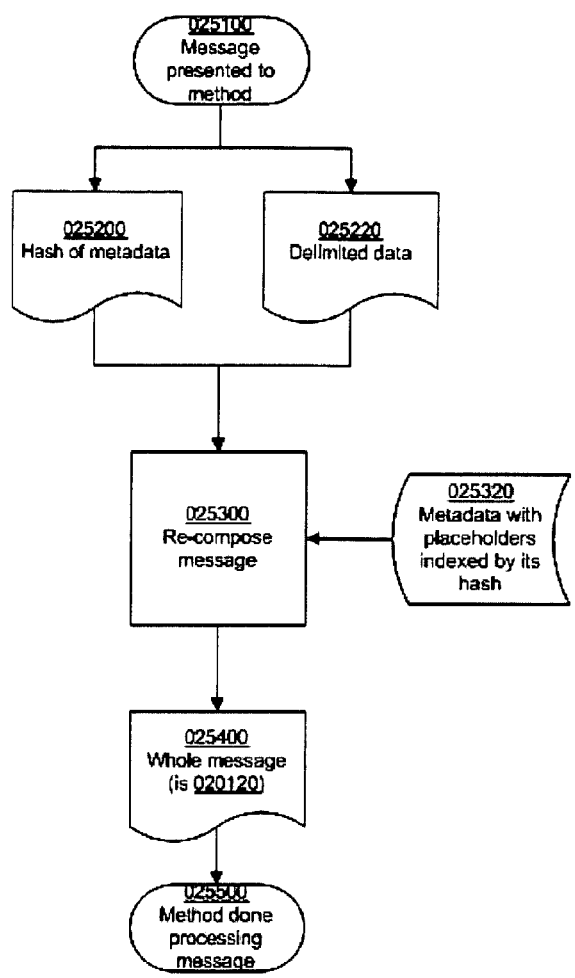
FIGURE 2(b). Flowchart for Recipient in a Communications System Embodiment

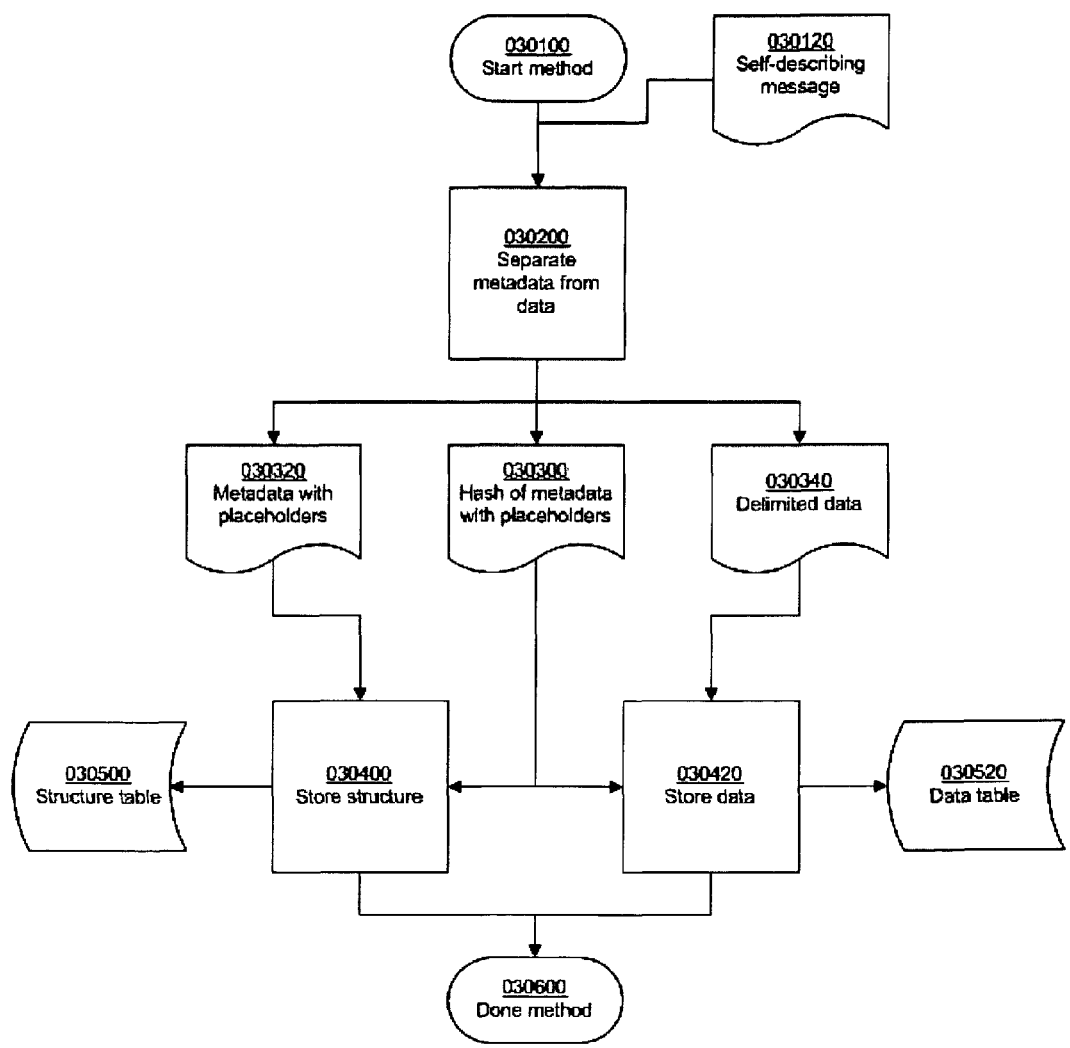
FIGURE 3(a). Flowchart for Encode/Store in a Storage System Embodiment

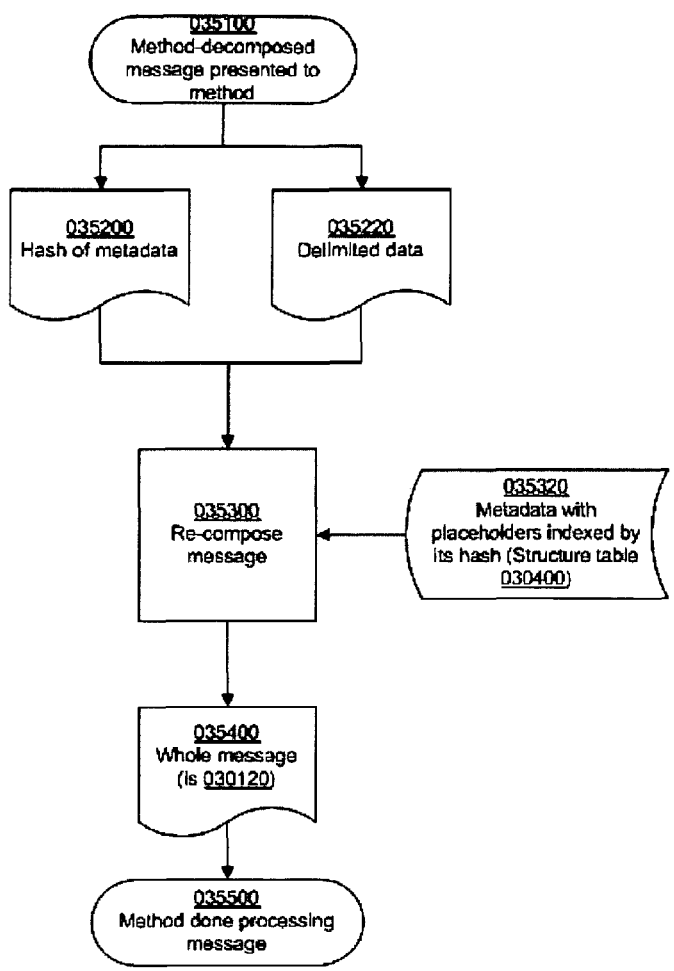
FIGURE 3(b). Flowchart for Decode/Retrieve in a Storage System Embodiment

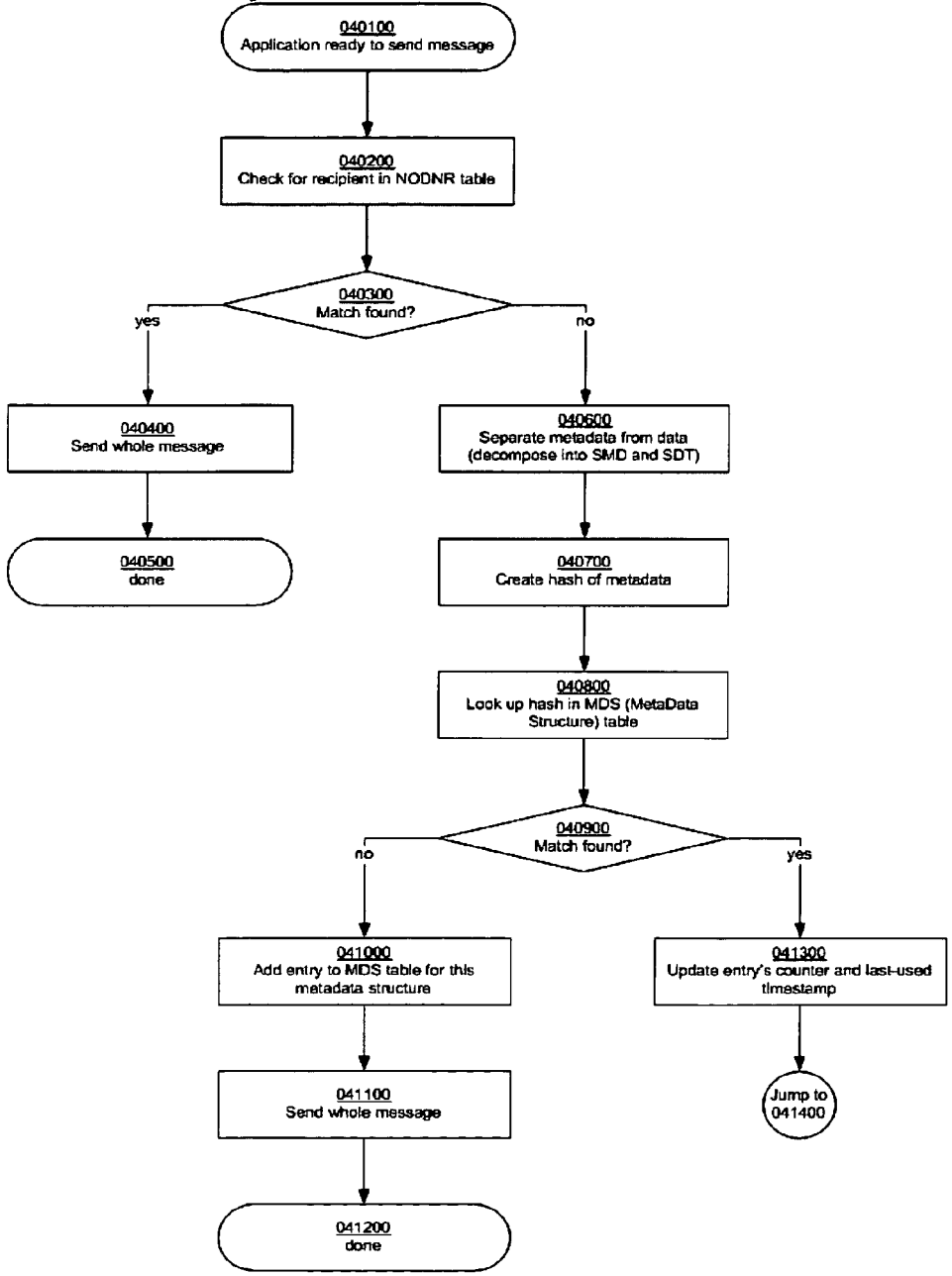

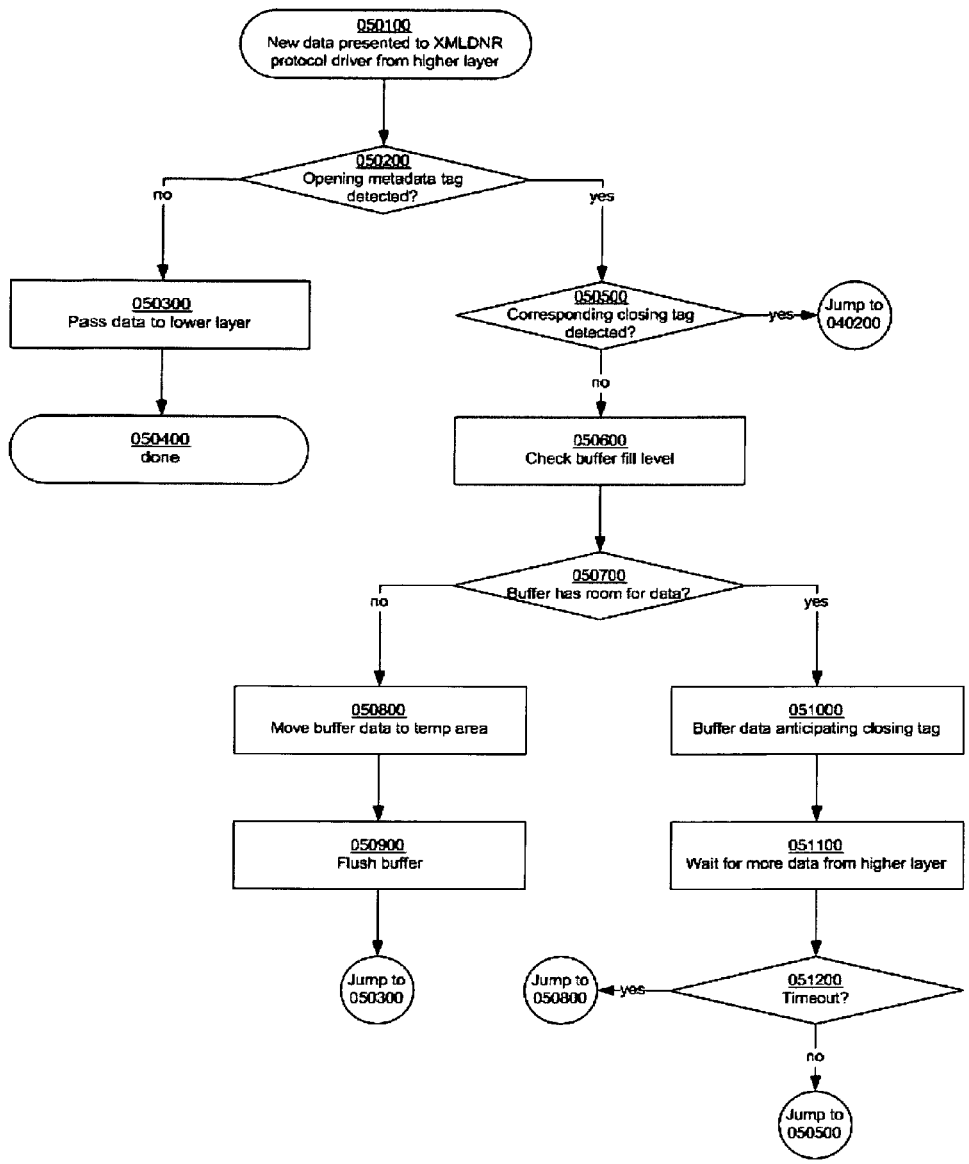
FIGURE 5A. Flowchart for Tightly Coupled Network Transport Layer Communicators in a Communications System Embodiment

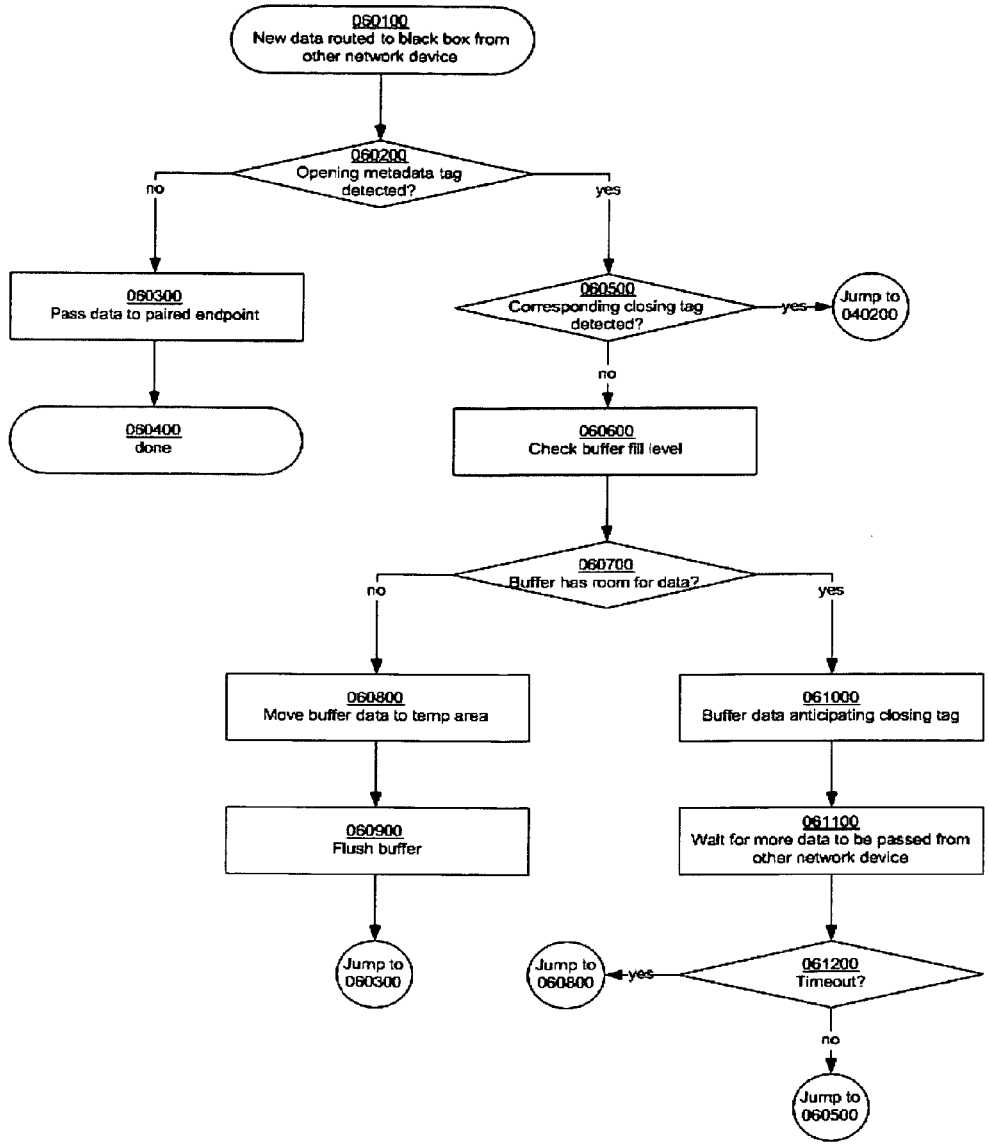
FIGURE 6A. Flowchart for Tightly Coupled Dedicated Circuit in a Communications System Embodiment

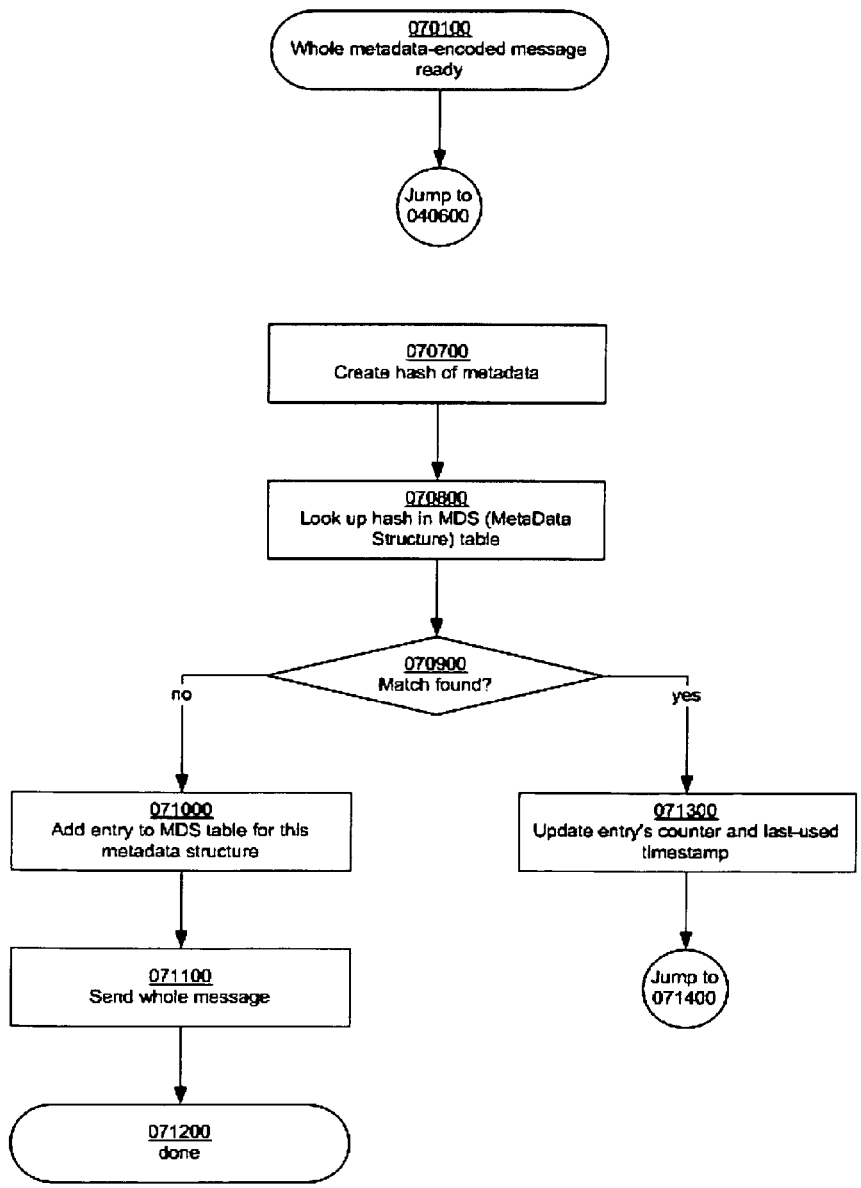
FIGURE 7A. Flowchart for , Tightly Coupled Dedicated Circuit After Detecting Whole Message in a Communications System Embodiment

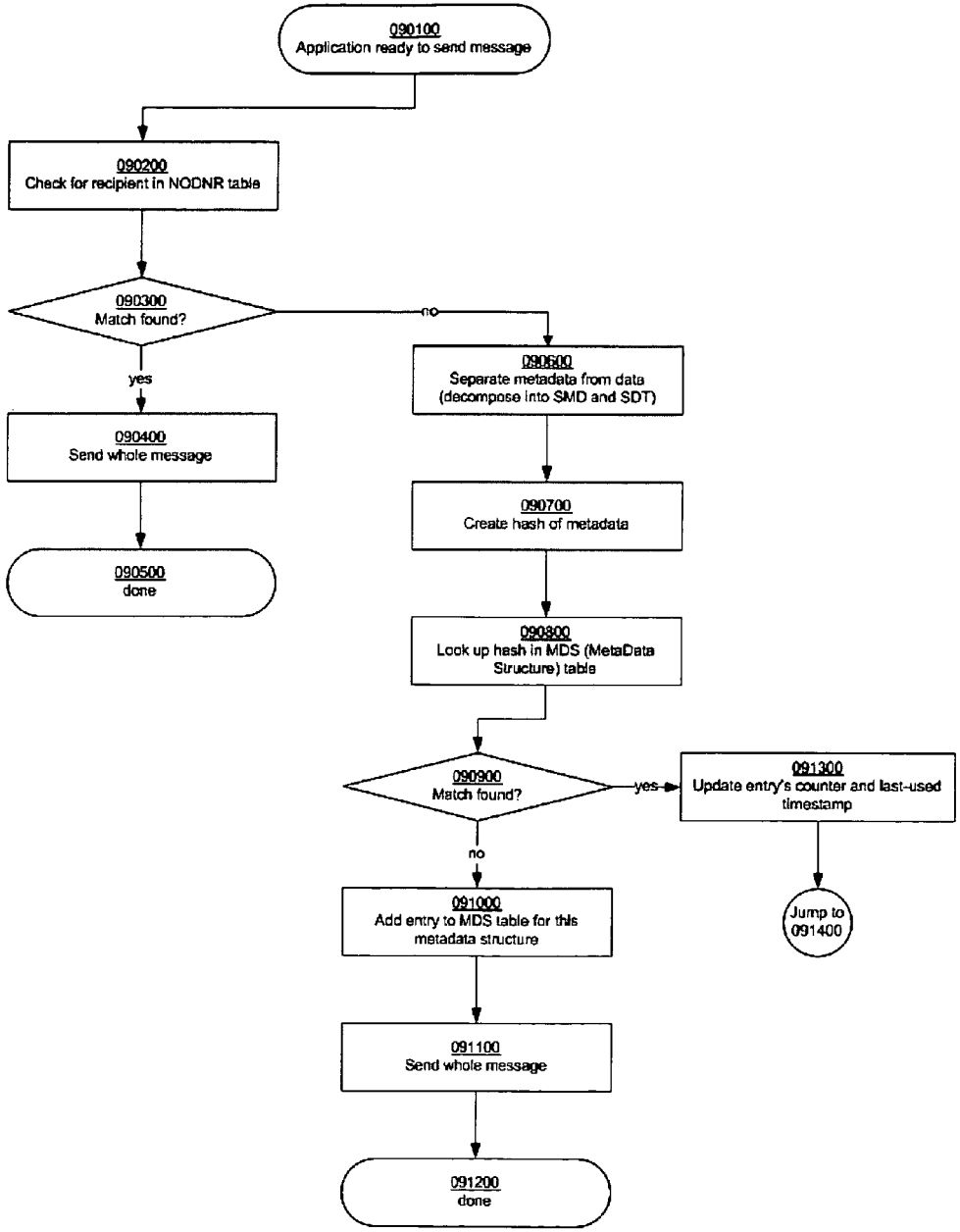
FIGURE 8A. Flowchart for Loosely Coupled Application Layer in a Communications System Embodiment

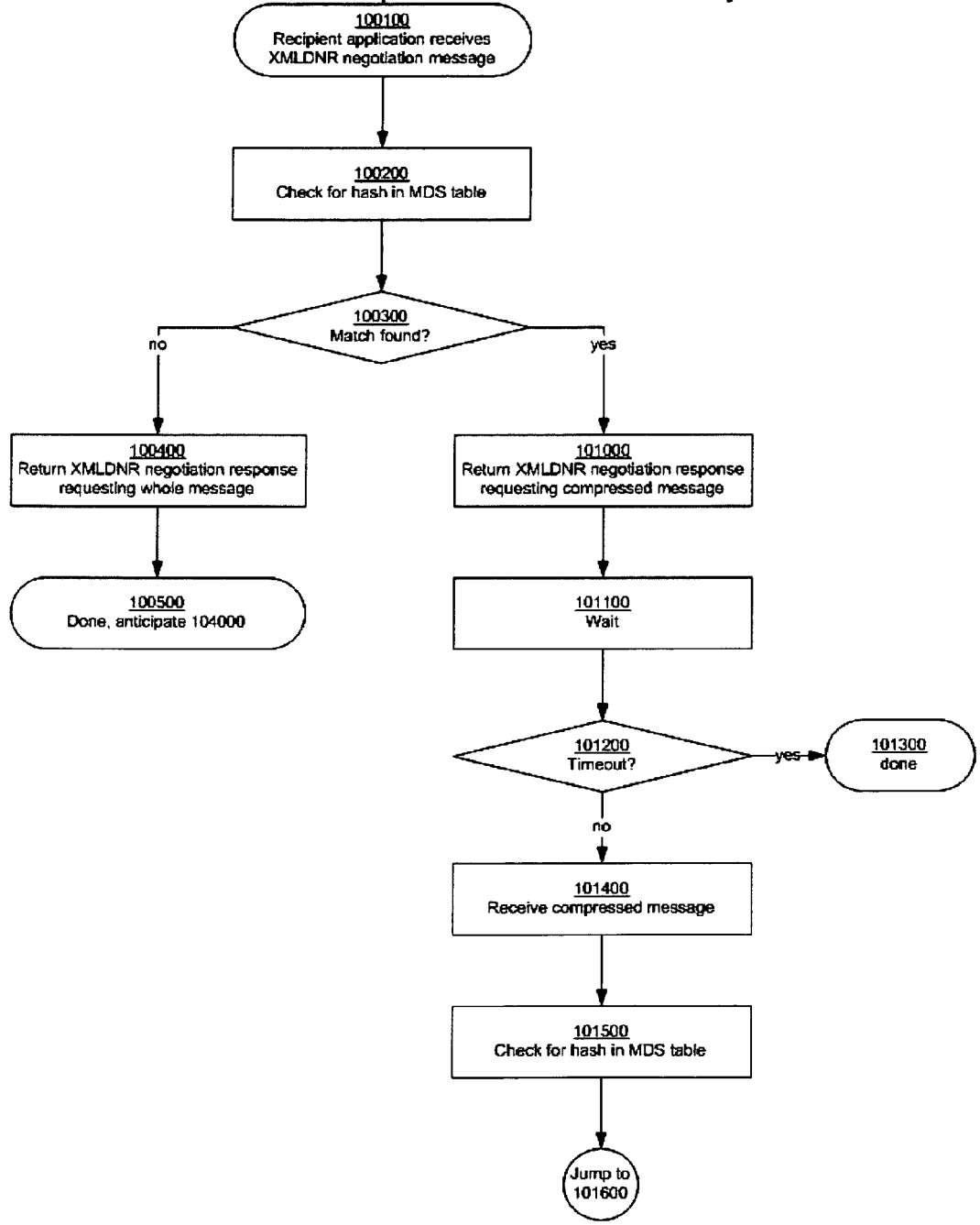
FIGURE 9A. Flowchart for Recipient in a Communications System Embodiment FIGURE 10. Illustration of Size Difference Between Initial Message (left) and Compressed Message (right)
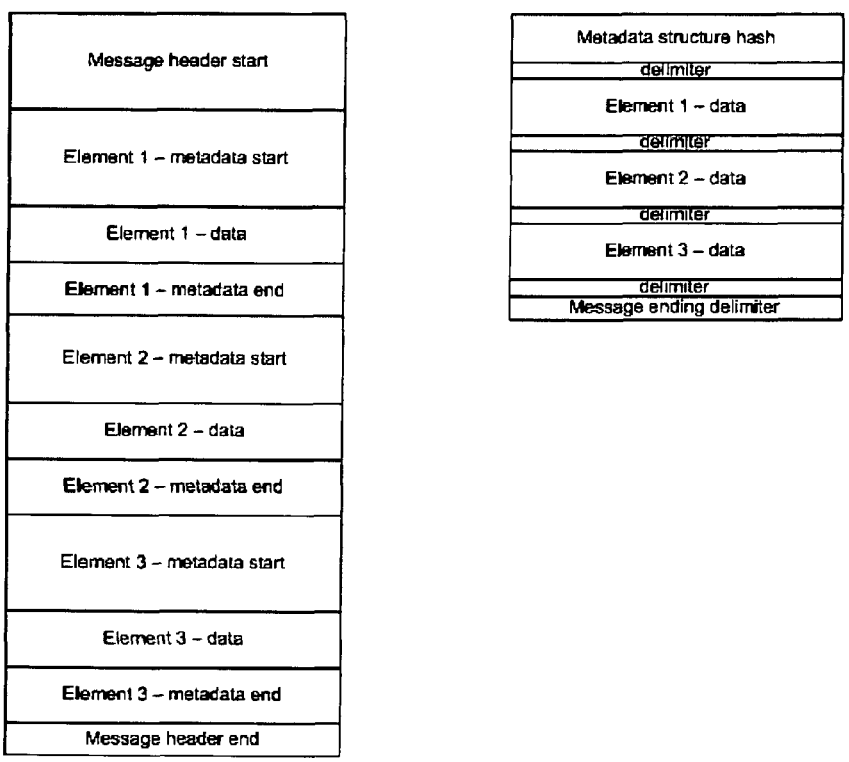

FIGURE 11. A Computing Device On a Network Embodiment
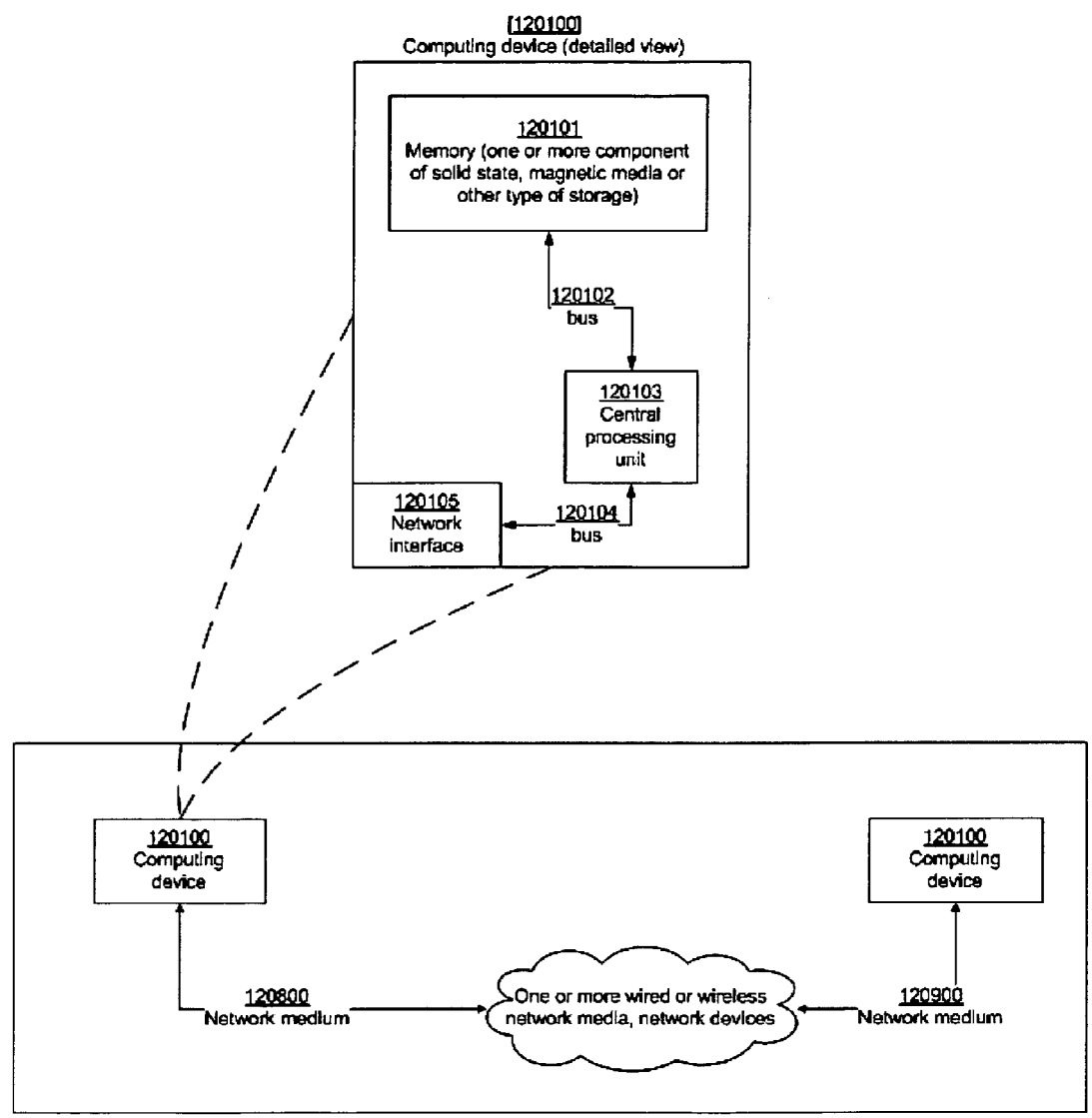

FIGURE #12: Illustration of Application Layer Software Implementation in Relation to 4-Layer Networking Stack
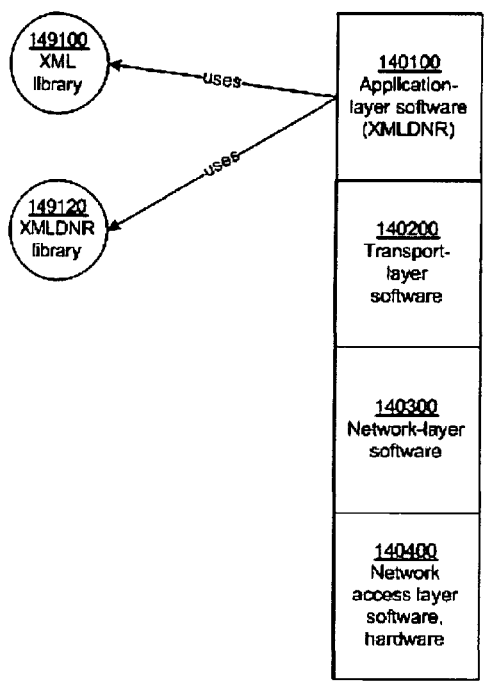

FIGURE 13. Illustration of Transport Network Layer Software Implementation in Relation to 4-Layer Networking Stack
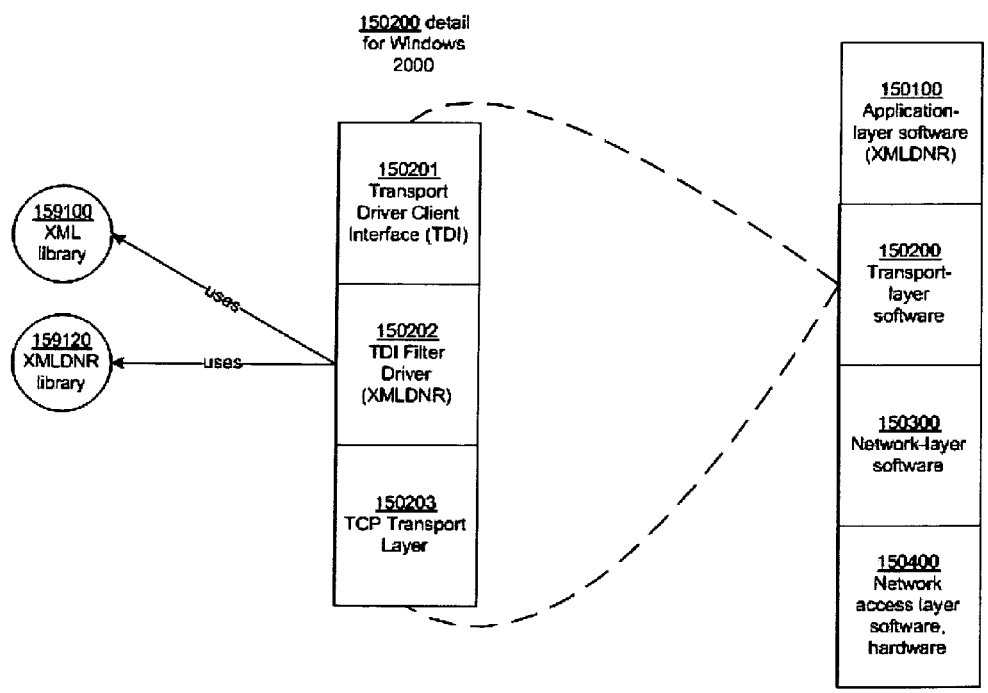

FIGURE 14. Illustration of Dedicated Circuit-Based System Embodiment
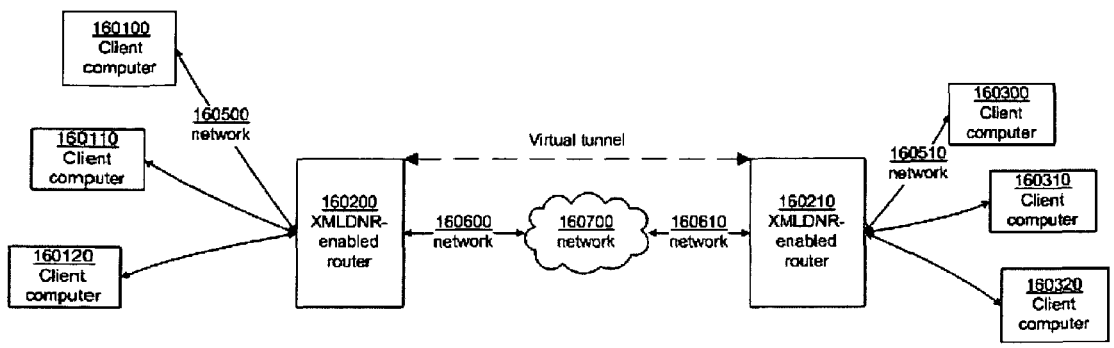
FIGURE 15. Illustration of Cell Phone Network System
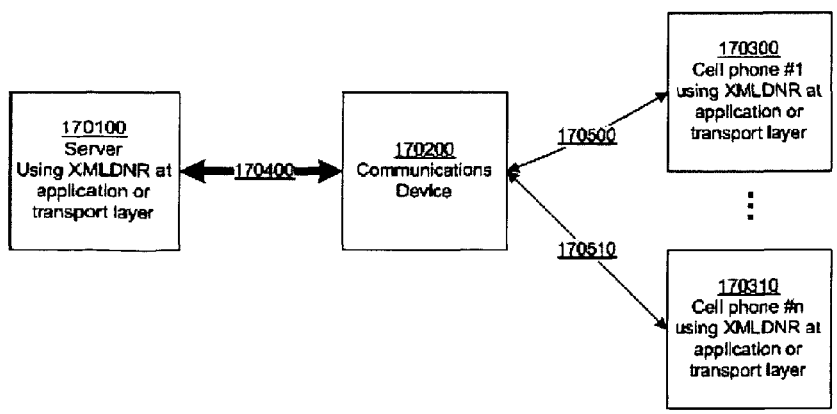

FIGURE 16. Illustration of Distributed Intrusion Detection System
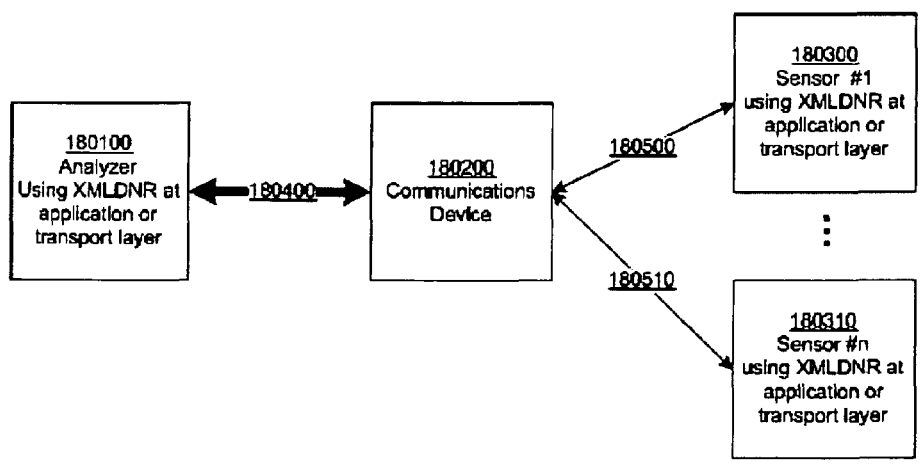

FIGURE 17. Illustration of Benefits Provided Using Cell Phone Network Embodiment
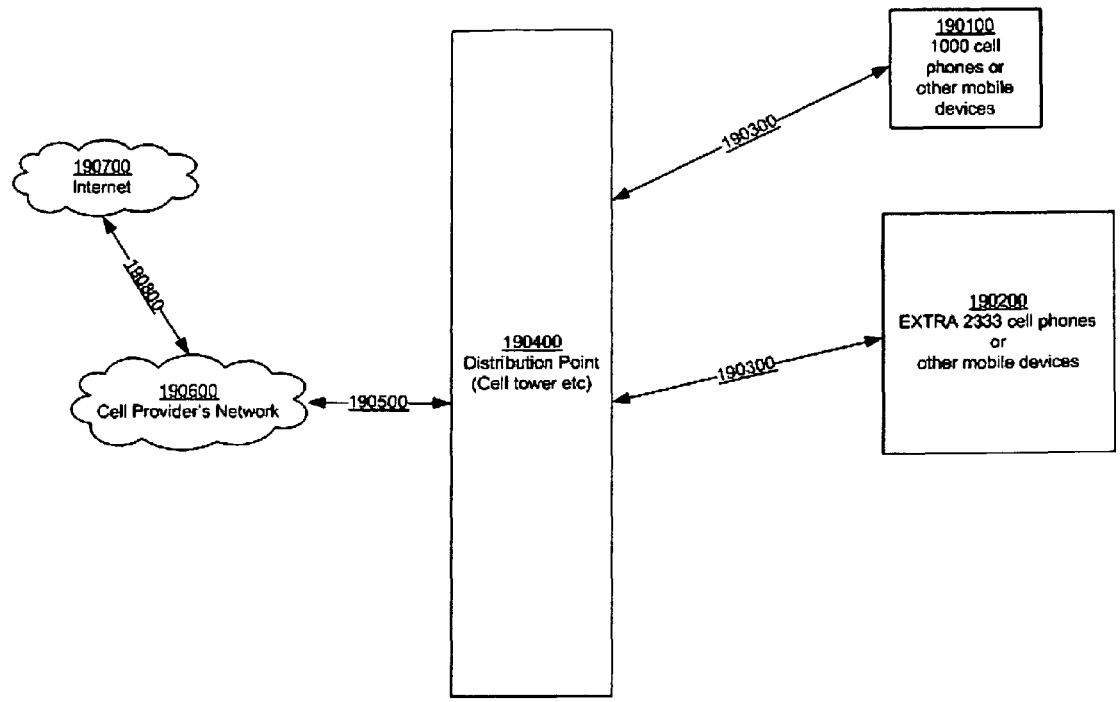

FIGURE 18A. Example of IDMEF Message Compressed Using Enclosed Method

```xml
<?xml version="1.0" encoding="UTF-8"?>

<!DOCTYPE IDMEF-Message PUBLIC "-//IETF//DTD RFC XXXX IDMEF v1.0//EN"
  "idmef-message.dtd">

<IDMEF-Message version="1.0" xmlns="urn:iana:xml:ns:idmef">
  <Alert messageid="abc123456789">
    <Analyzer analyzerid="bc-sensor01">
      <Node category="dns">
        <name>sensor.example.com</name>
      </Node>
    </Analyzer>
    <CreateTime ntpstamp="0xbc71f4f5.0xef449129">
      2000-03-09T10:01:25.93464Z
    </CreateTime>
    <Source ident="a1a2" spoofed="yes">
      <Node ident="a1a2-1">
        <Address ident="a1a2-2" category="ipv4-addr">
          <address>192.0.2.200</address>
        </Address>
      </Node>
    </Source>
    <Target ident="b3b4">
      <Node>
        <Address ident="b3b4-1" category="ipv4-addr">
          <address>192.0.2.50</address>
        </Address>
      </Node>
    </Target>
    <Target ident="c5c6">

<Node ident="c5c6-1" category="nisplus">
        <name>lollipop</name>
      </Node>
    </Target>
    <Target ident="d7d8">
      <Node ident="d7d8-1">
        <location>Cabinet B10</location>
        <name>Cisco.router.b10</name>
      </Node>
    </Target>
    <Classification text="Ping-of-death detected">
      <Reference origin="cve">
        <name>CVE-1999-128</name>
        <url>http://www.cve.mitre.org/cgi-bin/cvename.cgi?name=CVE-1999-128</url>
      </Reference>
    </Classification>
  </Alert>
</IDMEF-Message>
```

FIGURE 18B.

```xml
<?xml version="1.0" encoding="UTF-8"?>

<!DOCTYPE IDMEF-Message PUBLIC "-//IETF//DTD RFC XXXX IDMEF v1.0//EN"
    "idmef-message.dtd">

<IDMEF-Message version="1.0" xmlns="urn:iana:xml:ns:idmef">
        <Alert messageid="-">
            <Analyzer analyzerid="-">
                <Node category="-">
                    <name>-</name>
                </Node>
            </Analyzer>
            <CreateTime ntpstamp="-">
                -
            </CreateTime>
            <Source ident="-" spoofed="-">
                <Node ident="-">
                    <Address ident="-" category="-">
                        <address>-</address>
                    </Address>
                </Node>
            </Source>
            <Target ident="-">
                <Node>
                    <Address ident="-" category="-">
                        <address>-</address>
                    </Address>
                </Node>
            </Target>
            <Target ident="-">

<Node ident="-" category="-">
                    <name>-</name>
                </Node>
            </Target>
            <Target ident="-">
                <Node ident="-">
                    <location>-</location>
                    <name>-</name>
                </Node>
            </Target>
            <Classification text="-">
                <Reference origin="-">
                    <name>-</name>
                    <url>-</url>
                </Reference>
            </Classification>
        </Alert>
    </IDMEF-Message>
```

FIGURE 18C.

```
abc123456789
bc-sensor01
dns
sensor.example.com
0xbc71f4f5.0xef449129
2000-03-09T10:01:25.934642
a1a2
yes
a1a2-1
a1a2-2
ipv4-addr
192.0.2.200
b3b4
b3b4-1
ipv4-addr
192.0.2.50
c5c6
c5c6-1
nisplus
lollipop
d7d8
d7d8-1
Cabinet B10
Cisco.router.b10
Ping-of-death detected
Cve
CVE-1999-128
http://www.cve.mitre.org/cgi-bin/cvename.cgi?name=CVE-1999-128
```

FIGURE 19. XMLDNR Message Table in a DIDS Embodiment

| FIELD | DESCRIPTION |
|---|---|
| ID | MD5 hash of the IDMEF XML structure only (no data) |
| VALUE | Message XML structure only |
| SENTCOUNT | counter for number of times it has been sent |
| LASTUSED | timestamp for last time sent or received |

FIGURE 20. XMLDNR Message Fields in a DIDS Embodiment

| FIELD | DESCRIPTION |
|---|---|
| ID | MD5 hash for the XML structure |
| DATA | delimited IDMEF data. Delimiting allows the IDMEF record to be reconstructed at the recipient |

FIGURE 21. XMLDNR Message Compression Results in a DIDS Embodiment

| Message Type | IDMEF Size (Bytes) | C-IDMEF Size (Bytes) | % Of Orig |
|---|---|---|---|
| Ping of Death | 1097 | 363 | 33% |
| Port Scan | 1046 | 368 | 35% |
| Malformed UPnP Advertisement | 1972 | 783 | 40% |
| ICMP Destination Unreach Com. | 1380 | 499 | 36% |
| Prohibited SNMP Trap TCP | 2001 | 748 | 37% |

FIGURE 22. XMLDNR Message Bandwidth Reduction Results in a DIDS Embodiment ("*" denotes estimated scenarios)

| Message Type | Msgs Per Sec | Reduction (Kb/s) |
|---|---|---|
| Malformed UPnP Advertisement | 0.5 | 4.75 |
| ICMP Dest. Unreach Com. Prohibited | 1 | 7 |
| *Sasser Worm | 512 | > 2600 |
| *W32.SQLExch Worm | 23,041 | > 124800 |

FIGURE 23. Message Compression with XMLDNR and zlib in a DIDS Embodiment

| Message Type | IDMEF Size (Bytes) | C-IDMEF/zlib Size (Bytes) | % Of Orig |
|---|---|---|---|
| Malformed UPnP Advertisement | 1972 | 418 | 21% |
| ICMP Dest. Unreach Com. Prohibited | 1380 | 334 | 24% |

FIGURE 24. Bandwidth Reduction with XMLDNR and zlib in a DIDS Embodiment

| Message Type | Msgs Per Sec | Reduction (Kb/s) |
|---|---|---|
| Malformed UPnP Advertisement | 0.5 | 6.2 |
| ICMP Dest. Unreach Com. Prohibited | 1 | 8.4 |

BANDWIDTH SAVING SYSTEM AND METHOD FOR COMMUNICATING SELF DESCRIBING MESSAGES OVER A NETWORK

REFERENCES

[1] White G, E Fisch, and U Pooch. 1996. "Cooperating security managers: A peer-based intrusion detection system". IEEE Network Vol. 10 No. 1, pp 20-23.

[2] Snapp S R, S E Smaha, D M Teal, and T Grance. 1992. "The DIDS (distributed intrusion detection system) prototype. In The Summer USENIX Conference, San Antonio, Tex., USENIX Association, pp. 227-233.

[3] Balasubramaniyan J S, J O Garcia-Fernandez, D Isacoff, E Spafford, and D Zamboni. 1998. "An architecture for intrusion detection using autonomous agents". In Proceedings of the 14th IEEE Computer Security Applications Conference.

[4] Porras P A and P G Neumann. 1997. "EMERALD: event monitoring enabling responses to anomalous live disturbances." In Proceedings of the 20th National Information Systems Security Conference, pp. 353-365.

[5] Debar H, D Curry, and B Feinstein. 2004. "The Intrusion Detection Message Exchange Format, draft-ietf-idwg-idmef-xml-12." IETF Internet Drafts, work in progress.

[6] Rivest R. 1992. "The MD5 Message-Digest Algorithm". IETF RFC1321 Informational document.

[7] Mirkovic J and P Reiher. 2004. "A Taxonomy of DDoS Attack and DDoS Defense Mechanisms." In ACM SIGCOMM Computer Communication Review, Volume 34, Issue 2, ISSN:0146-4833, pp. 39-53.

[8] Chen L, T A Longstaff, and K M Carley. 2004. "Characterization of DDOS Defense Mechanisms". Computers & Security, Vol. 23, No. 8, pp. 665-678.

[9] Janakiraman R, M Waldvogel, and Q Zhang. 2003. "Indra: A peer-to-peer approach to network intrusion detection and prevention". In Proceedings of the IEEE Twelfth International Workshop on Enabling Technologies: Infrastructure for Collaborative Enterprises, pp. 226. Linz, Austria.

[10] Feinstein B, G Matthews, J. White. 2002. "The Intrusion Detection Exchange Protocol (IDXP), draft-ietf-idwg-beep-idxp-07." IETF Internet Drafts, work in progress.

[11] Rose M. 2001. "The Blocks Extensible Exchange Protocol Core." IETF RFC3080 Draft Standard.

[12] Greenfield D. January 2005. "Web Services' Minority Report." Network Magazine, 30-43.

[13] zlib software library. Accessed Jan. 1, 2005 at http://www.gzip.org/zlib/ (website).

[14] Snort software. Accessed Jan. 1, 2005 at http://www.snort.org (website).

[15] Snort IDMEF Plug-in software. Accessed Jan. 1, 2005 at http://sourceforge.net/projects/snort-idmef/ (website).

[16] Libxml2 software library. Accessed Jan. 1, 2005 at http://www.xmlsoft.org (website).

[17] OpenSSL software library. Accessed Jan. 1, 2005 at http://www.openssl.org/ (website).

[18] NMap software. Accessed Jan. 1, 2005 at http://www.insecure.org/nmap/ (website).

[19] Gnu C library. 2004. "21.3.1 CPU Time Inquiry". Accessed Jan. 1, 2005 at http://www.gnu.org/software/libc/manual/html_node/CPU-Time.html#CPU-Time (webpage).

[20] WORM_SASSER.A. Trend Micro. 2005. Accessed Feb. 24, 2005 at http://www.trendmicro.com/vinfo/virusency-clo/defaults.asp?VName=WORM%5FSASSER%2EA&VSect=T.

[21] Ferrie P and F Perriot. August, 2004. "Mostly Harmless." Virus Bulletin, pp 5-8. Accessed Feb. 24, 2005 at http://www.virusbtn.com/magazine/issues/pdf/2004/200408.pdf (Last updated Jul. 28, 2004).

[22] Hanson D, B Kostanecki, R Jagodzinski, and J V Miller. "A Comparison Study of Three Worm Families and Their Propagation in a Network." Security Focus. Accessed Feb. 24, 2004 at http://www.securityfocus.com/infocus/1752 (Last updated Dec. 10, 2003).

[23] Christophides V, S Cluet, and J. Simèon. 2000. "XMill: an efficient compressor for XML data." In Proceedings of the 2000 ACM SIGMOD international conference on Management of data (SIGMOD '00), pp. 245-253.

See also

[24] http://cybertrain.labworks.org/conferences/april2005/Acampora_Joseph_XMLDNR.pdf

[25] http://public.research.att.com/~bala/papers/common.pdf

DESCRIPTION OF INVENTION

The enclosed system and method provides a means by which metadata-encoded and/or otherwise self-describing messages can be compressed. Benefits derived from the use of this method include: reduction of disk or other memory storage space required to store a given set of messages; reduction of bandwidth required to communicate a given set of messages across a network, bus or other medium.

DEFINITION OF TERMS USED WITHIN THIS DOCUMENT

The disclosed term MDDNR as used herein is defined as MetaData Decompose-Negotiate-Recompose, which is the method disclosed within this document.

The disclosed term MDDNR protocol as used herein refers to the protocol of the disclosed method.

The disclosed term XMLDNR as used herein is defined as a synonym for MDDNR. The letters "XML" are present and "XMLDNR" is used often because the most common metadata language in use within network communications is currently XML.

The disclosed term XMLDNR protocol as used herein refers to the protocol of the disclosed method.

The term message as used herein is defined as a signaled object of communication, comprising data and optionally metadata.

The term document as used herein refers to a computer data file, which may also be a message.

The term metadata as used herein is defined as data that describes data. A metadata-encoded message is defined as a message that contains data, and also contains data that describes that data. An example comprising a message that contains a person's first name, last name and social security number as its data, and also contains data that describes that person's first name, last name and social security number data, comprising the starting and ending points of each of those three items of data within said message, and the data type of each being alphabetic for first name and last name, and numeric for social security number. The term metadata is also used to refer to data about a message itself, comprising data about the starting and ending points of the message, the type or language of metadata used with the message.

The term metadata tag as used herein is defined as the representation of metadata within a message. A metadata tag may optionally be referred to as a starting or ending metadata tag, or simply a starting or ending tag.

To create a distinction between the metadata of a message and the data that said metadata describes, we define the optional term kernel data to describe the data of a message that is described by metadata.

The terms self-describing, metadata-encoded, and metadata-formatted as used herein in relation to a message is defined as a message comprising data and metadata that describes said data. Said terms may be used in conjunction with a collection of one or more messages.

The known technique of MD5 hashing as used herein is defined as the use of the well-known MD5 algorithm developed by Ronald Rivest for the generating of a unique 128-bit numeric value derived from a variable length message. Said unique 128-bit numeric value is optionally referred to as a hash, checksum or digest, these terms to be used interchangeably. Said unique 128-bit value may be represented as a 32 character hexadecimal value whose digits are comprised from the sets 0-9 or A-F.

Hashing is used to convert an identifier or key, meaningful to a user, into a value for the location of the corresponding data in a structure, such as a table. A hash total is an error-checking value derived from the addition of a set of numbers taken from data (not necessarily numeric data) that is to be processed or manipulated in some way. After processing, the hash total is recalculated and compared with the original total. If the two do not match, the original data has been changed in some way. The disclosed system and method utilizes for example a MD5 hash of only 16 bytes in length, conserving global network system resources.

The term hash as used herein is defined as a small unique value which can be used to represent data.

The term hash comparison as used herein is defined as the steps executed to compare one hash to another hash to determine if they are identical to one another or not.

The known term gzip, also capitalized as GZIP, as used herein is defined as the software file compression algorithm provided within the GNU operating system. GNU is an acronym for "GNU's Not Unix". GZIP. The term zlib, also capitalized as ZLIB, is a software library that exposes the functionality of gzip to other software.

The term token as used herein is defined as an identifier used to represent a group of characters. JSaid group of characters comprising a word, a metadata tag, a group of repeated characters within a message or within a larger group of characters.

The technique of tight coupling as used herein is defined as a relatively high dependence of two systems that communicate messages between each other on one or more factors comprising: data residing on both systems, data shared between both systems which is obtained through negotiation between systems for transfer of that data, as signals in a circuit.

The technique of loose coupling as used herein is defined as a relatively low dependence of two systems that communicate messages between each other on one or more factors comprising: data residing on both systems, data shared between both systems which is obtained through negotiation between systems for transfer of that data.

The term XML as used herein is defined as Extensible Markup Language, which is a language used for describing data, and which is derived from SGML. It may also be used to describe descendent languages which also describe data.

The known term data structure as used herein is defined as a way of storing data in a computer.

The known term node as used herein is defined as an object of data, when used in relation to data structures. It may also be used as a general term for a computer or network device within a communications network.

The term endpoint, or endpoint node as used herein is defined as a computer or network device within a communications network, either from which the communication of a message originates and is sent, or for which the communication of a message is ultimately intended as specified by the endpoint sending the message.

The known term tree as used herein is defined as a data structure that emulates the structure of a living tree turned upside down, having a root at the top, and subsequently branches and then leaves. The tree in terms of data structure comprises linked nodes, with a root node at the top, having one or more child nodes below it, and no parent nodes above it. Each child node has at most one parent node, and one or more child nodes of its own. A node with no child nodes of its own is known as a leaf node.

The term SGML as used herein is defined as Standard Generalized Markup Language, which is a language used for defining markup languages which themselves are used to describe data.

The known term Ping of Death refers to a well-known type of attack executed against a computer or network device. The attack involves sending a ping Internet control message to a victim where said message is constructed or directed maliciously.

The term computer, alternatively called computer device, as used herein is defined as a programmable electronic device that can store, retrieve, and process data.

The term software, alternatively called computer software, as used herein is defined as instructions which can be executed by a computer.

The term library, alternatively called a software library, as used herein is defined as a collection of software subprograms, any one or members of which may be used by software programs external to the collection, or by other such subprograms themselves.

The term XML library as used herein is defined as a software library providing specific functionality pertaining to XML, comprising methods for parsing and otherwise manipulating XML formatted documents.

The term XMLDNR library as used herein is defined as a software library providing specific functionality pertaining to XMLDNR, comprising methods for: calling other methods from an XML or other metadata-related library; one or more methods for creating a set of kernel data from an XML or other type of metadata-formatted document; one or more methods for creating a set of metadata from an XML or other type of metadata-formatted document; one or more methods for generating a hash from a set of metadata; one or more methods for communicating or storing messages either in their entirety as presented to said library while using said library, or in a part or parts thereof.

The term WML as used herein is defined as Wireless Markup Language, which is a markup language based upon XML, and is used to format documents for processing by devices that implement the Wireless Application Protocol, such as cell phones. Wireless Application Protocol may be abbreviated to the acronym WAP.

The term HTML as used herein is defined as Hypertext Markup Language, which is a language used to format web pages and other hypertext which is typically viewed in a web browser.

The term HTTP as used herein is defined as Hypertext Transfer Protocol, which is a protocol used to transfer HTML formatted documents. HTTP has also become popularly used for applications other than those related to HTML.

The term IDS as used herein is defined as an Intrusion Detection System, which is a system that monitors on or more computer networks or hosts for signs of attack or misuse. The system comprises sensors which observe computer networks or hosts, analyzers which are sent information from sensors and analyze information based on such information, and managers which coordinate the operation of the IDS.

The term DIDS as used herein is defined as a Distributed Intrusion Detection System, which is an IDS, the components of which may be distinct and separate software programs, and may be exist at diverse parts of a network. A DIDS may also comprise separate IDSs in communication with one another.

The known data format IDMEF as used herein is defined as the Intrusion Detection Message Exchange Format. IDMEF was developed by an IETF workgroup called the IDWG. IETF is an acronym for the Internet Engineering Task Force, an open international community concerned with the evolution of Internet architecture and the smooth operation of the Internet. IDWG is an acronym for the Intrusion Detection Workgroup, a workgroup concerned with the operation and management of, and messaging related to intrusion detection systems.

The disclosed term C-IDMEF as used herein is defined as describing a message that was formerly formatted according to the IDMEF format, and through processing by the disclosed method, said IDMEF message was decomposed to comprise a message in the C-IDMEF format, also known as a C-IDMEF message. A C-IDMEF message comprises the set of data from said IDMEF message, extracted from said IDMEF message and related metadata formatting, and delimited to mark the start and end of each field within the set. A C-IDMEF message also comprises a hash which is obtained according to the disclosed method from said IDMEF message, and which represents the set of metadata from said IDMEF message.

The term IDS sensor, alternatively termed DIDS sensor when used in conjunction with a DIDS, used herein is defined as a component of an IDS which observes computer networks or hosts, attempts to detect signs of attack or misuse based on comparison of its observations with known attack or misuse observations, and provides data related to such observations and comparisons to one or more IDS analyzers.

The term IDS analyzer, alternatively termed DIDS analyzer when used in conjunction with a DIDS, used herein is defined as a component of an IDS which obtains data from one or more IDS sensors regarding sensor-based observations and comparisons and attempts to ascertain whether an attack or misuse is in effect through analysis of obtained data from all sources.

The term IDS hierarchy, also termed DIDS hierarchy when referring to components within a DIDS, as used herein is defined as the relationship between at least three levels of DIDS components, where data is passed up from the first level; comprising sensors, to the second level, comprising analyzers, and from the second level to the third level, comprising managers.

The known term BEEP as used herein is defined as referring to the Blocks Extensible Exchange Protocol, which is a message exchange protocol framework. It provides a general messaging framework that can be modified for specific applications through the use of BEEP profiles.

The known term IDXP as used herein is defined as referring to the Intrusion Detection Exchange Protocol, which specifies a profile for BEEP, and which was developed by the IDWG for the communication of IDMEF messages.

The known term heartbeat as used herein is defined as the signalling between computers, network devices or other such members of a system which provides information for maintaining and coordinating operation of said system, said information comprising whether a member of the system is able to function according to system expectations, the current status of said system.

The known term alert, or IDS alert, as used herein is defined as the signalling between computers, network devices or other such members of an IDS, communicating information about events comprising information about an intrusion or misuse event or suspected intrusion or misuse event.

The term transparent as used herein to describe a characteristic of a method, process, procedure, program, subprogram, network layer is defined as that said entity offering service or function to another entity whereby the second entity need not alter the method by which such service or function is consumed or employed despite said entity possibly comprising being a replacement for another entity, or offering modified, added or subtracted service or function.

The term communicator as used herein is defined as a computer or network device sending or receiving signals over a network.

The term API as used herein is defined as an Application Programming Interface, which is the interface that a computer system, library or application provides in order to allow requests for service to be made of it by other computer programs, and/or to allow data to be exchanged between them.

The term metadata API as used herein is defined as an API designed to provide metadata-related services.

The term placeholder as used herein is defined as a control signal placed at a given location within a message, replacing a variably sized distinct portion of said message at said given location. Said placeholder provides a reference point for returning said portion of message to said given location. A placeholder signal only occurs within said message as a placeholder signal, providing no other meaning, and not occurring as any other part of said message.

The term delimiter as used herein is defined as a control signal used to separate one or more fields of data within a body of data. A delimiter signal only occurs within said body of data as a delimiter signal, providing no other meaning, and not occurring as any other part of said body of data.

The term delimited data as used herein is defined as a body of data that includes a given delimiter, and from which fields of data can be separated.

The term set of metadata as used herein is defined as a collection of metadata tags.

The term canonicalized set of metadata as used herein is defined as a set of metadata which is organized according to a given standard method, such that any other set of metadata that may be organized differently but is otherwise identical to said set of metadata, after being organized according to said given standard method will be identical to said set of metadata.

The term metadata hash as used herein is defined as a hash derived from a given set of metadata.

The term structure identifying checksum as used herein is defined as being synonymous with the term metadata hash.

The term conversation as used herein is defined as the communication of messages or other data between two endpoints across a network.

The term network link as used herein is defined as the wired or wireless network medium between two computers or network devices in any combination.

The term aggregation of messages as used herein is defined as the communication of the messages of multiple conversations across the same network link.

The term inter-module communication as used herein is defined as communication between separate modules or components of a system, such as the sensors, analyzers and managers of a DIDS.

The term orchestration algorithm as used herein is defined as the method by which communications are automatically coordinated and managed between a group of communicators.

The term protocol as used herein is defined as a set of rules regarding syntax, semantics and synchronization of communication.

The known term plug-in as used herein is defined as computer software which is designed for and can be optionally utilized within a given software program or system to enhance or otherwise modify the operation of said program or system.

The known term network stack as used herein is defined as a layered architecture (plan) that standardizes levels of service and types of interaction for computers exchanging information through a communications network. An example is the ISO/OSI network stack, also known as the International Organization for Standardization Open Systems Interconnection reference model. The ISO/OSI reference model separates computer-to-computer communications into seven protocol layers, or levels, each building—and relying—upon the standards contained in the levels below it. The lowest of the seven layers deals solely with hardware links; the highest deals with software interactions at the application-program level. It is a fundamental blueprint designed to help guide the creation of networking hardware and software. The International Standards Organization Open Systems Interconnection is similar to the TCP/IP stack, where the upper three layers are condenced from Application, Presentation and Session to simply Application Layer, and where lower two layers are condenced from the Data Link and Physical to simply the Network Access Layer.

The known term network traffic as used herein is defined as signals transmitted over a network comprising distinct entities depending on the scope of analysis within a given network stack.

The known term port scanning as used herein is defined as an analysis of a given target computer system's networking presence, capabilities and state through probing from an external source. Said probing is comprised by directing network traffic at particular transport layer ports of said target computer and analyzing any responses returned by said target computer.

The known term NMAP as used herein is defined as the name of a software program developed by Fyodor that performs port scanning.

The term application, or computer application, as used herein refers to a computer program whose network communication comprises communicating from the application layer of a network stack.

The term virtual tunnel as used herein is defined as communication between two non-endpoints within a network which establish themselves as alternatively sending and receiving endpoints for a new conversation between each other, where network communications are carried over said conversation on behalf of other endpoints within same network. The purpose of said virtual tunnel comprises encapsulating said network traffic in encrypted form for security, and or in compressed form for efficiency, and or with XMLDNR method for compression.

BRIEF DESCRIPTION OF THE DRAWINGS

FIG. 1(a)—Message Decompose in a send/store, multiuse method

FIG. 1(b)—Message Recompose in a multiuse method

FIG. 2(a)—Flowchart for sender in a communication system embodiment

FIG. 2(b)—Flowchart for recipient in a communication system embodiment

FIG. 3(a)—Flowchart for encode/store

FIG. 3(b)—Flowchart for decode/retrieve

FIG. 4(a)-(c)—Flowchart for tightly coupled application layer communicators

FIG. 5(a)-(b)—Flowchart for tightly coupled network transport layer communicators FIG. 6(a)-(b)—Flowchart for tightly coupled dedicate circuit FIG. 7(a)-(c)—Flowchart for tightly coupled dedicated circuit after detecting whole message FIG. 8(a)-(b)—Flowchart for loosely coupled application layer FIG. 9(a)-(b)—Flowchart for recipient FIG. 10—Size difference between initial message and compressed message FIG. 11—Computing device FIG. 12—Application layer software implementation in relation to 4-layer network stack FIG. 13—Transport layer software implementation in relation to 4-layer network stack FIG. 14—Dedicated circuit based system FIG. 15—Cell phone network FIG. 16—Distributed Intrusion Detection System FIG. 17—Benefits provided using cell phone network FIG. 18(a)-(c)—IDMEF Message compressed FIG. 19—XMLDNR message table FIG. 20—XMLDNR Message fields FIG. 21—XMLDNR message compression results FIG. 22—XMLDNR message bandwidth reduction results FIG. 23—Message compression with XMLDNR and zlib FIG. 24—Bandwidth reduction with XMLDNR and zlib The enclosed system and method differs from others in terms of (a) the scope of the objects upon which it performs and (b) its indifference in areas such as self-describing language semantics and individual tag usage statistics. The enclosed system and method operates upon messages, recognizing distinctions in and repetition of message metadata structure and retaining and utilizing memory of such in execution of the method. Therefore the scope of the enclosed system and method is of message objects over given periods of time. Existing systems with similar goals have scopes that focus upon single messages, with no relation between messages, or on characters or character strings within messages, with no recognition of the higher level organization of those characters within a metadata structure. The enclosed system and method utilizes the gestalt of each metadata structure in its operation and its dependence on self-description is limited to the expectation that data is somehow encapsulated or marked within metadata, whereas existing systems have described dependence upon the frequency of use and semantics of individual metadata tags and/or message data.

Figure 4B:
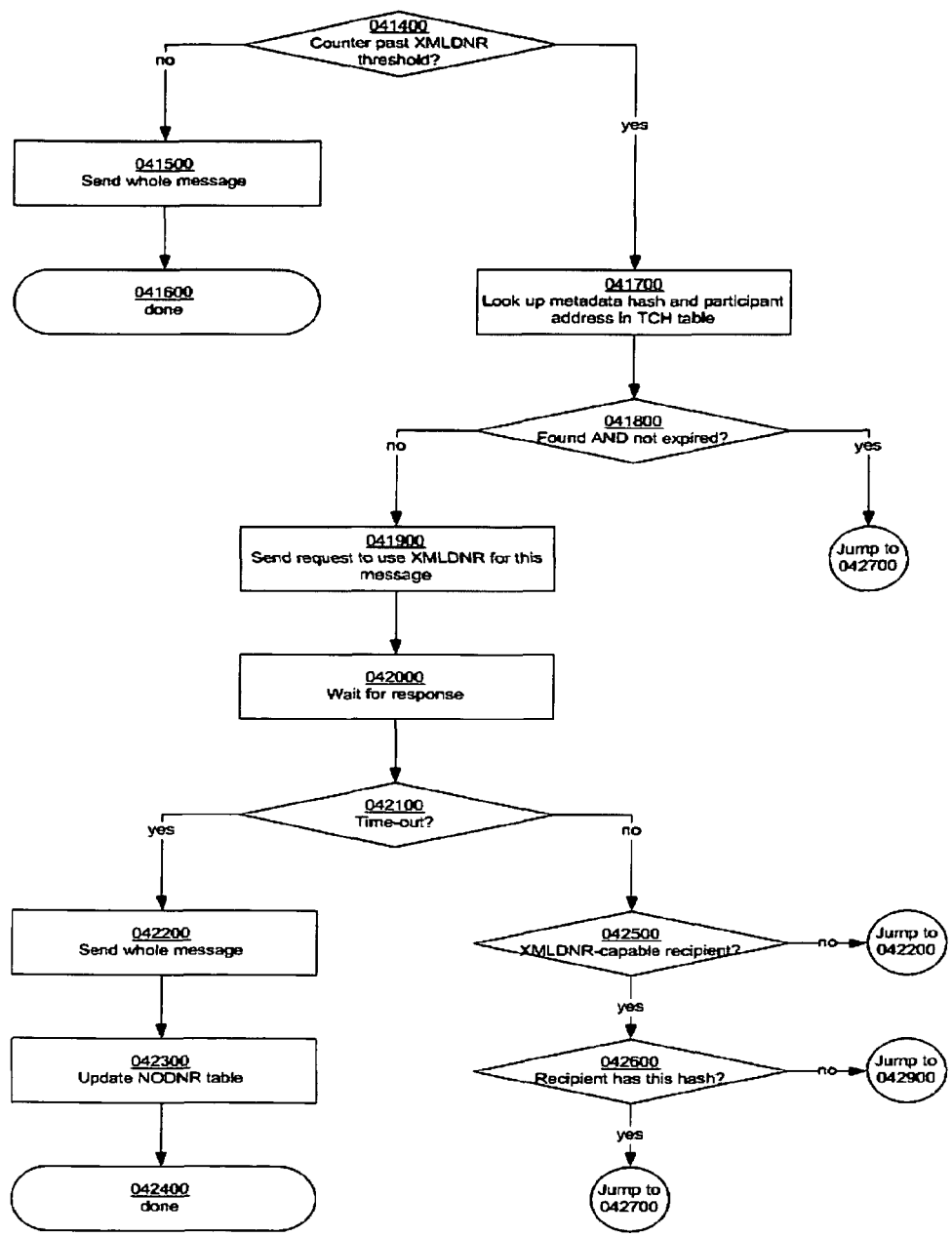

The operation of the disclosed method as described herein comprises: (a) the decomposition of a self-describing message into its two constituents, a set of metadata and a set of kernel data; (b) the generation of a metadata hash derived from said set of metadata, said metadata hash acting as a compact replacement for said set of metadata through communication or storage of said self-describing message, and as an efficiently compared representative for identifying completely identical sets of metadata; (c) optional analysis of the repetition of usage of any particular set of metadata over time; (d) optional negotiation between a network node sending a self-describing message and a network node receiving said message, and subsequent sending and receiving of said message, at said sender and said recipient respectively, in its entirety or in one or more parts of said set of metadata, said kernel data, said metadata hash; and (e) recomposition of a self-describing message to its original form prior to said decomposition.

Referring to the previous paragraph, an XMLDNR decomposed message comprises said set of kernel data, said set of metadata, and said metadata hash.

Said negotiation as described in (d) above comprises: communication between said sender and said recipient to determine status information regarding whether said recipient is capable of using disclosed method to receive and recompose said self-describing message as one or more parts of said XMLDNR decomposed message; and communication of said status information to sender.

In embodiments where the enclosed system and method is utilized to communicate messages, the enclosed system and method may employ a close association between communicating participants, also known as tight coupling. In such a scenario, negotiation between participants for receipt of messages that have specific metadata structures is done as seldom possible, reducing communication overhead, and message communication relies on negotiation that might have been conducted remotely in time and whose dependability is exposed to varied risks over time. An alternative to tight coupling is loose coupling, where negotiation is conducted more frequently, as often as per individual message irrespective of recognized repetition of its metadata structure. Loose coupling incurs greater communication overhead, simultaneously achieving reducing the risk of dependence on previous negotiation failing.

Enclosed system and method comprises in one embodiment a bandwidth-saving technique utilizing in one robust embodiment a SGML—Decompose-Negotiate-Recompose methodology for example compacting in one embodiment XML-encoded messages. In one embodiment from SGML the disclosed system and method recognizes the repetition of metadata between communicating participating nodes and enables further communication of such metadata to be abbreviated to a hash. Where metadata previously may have consumed kilobytes of bandwidth per message, the disclosed system and method reduces that consumption to a minimal byte expense. Utilizing processing power to create hashes and conduct hash comparisons, plus the additional network handshaking to enable the protocol of the disclosed method between participants allows for minimal size in bytes.

An aspect of the disclosed methodology in one or more embodiments is that it can be transparent to communicating applications. In one embodiment, a message sender at the application layer of the network stack, also known as an application, forwards data down the network stack towards the transport layer for ultimate delivery to its destination across a network. The enclosed method being implemented at the transport layer of the network stack filters message traffic passing through the transport layer, while the application interacts with the transport layer normally, without regard to the implementation of the enclosed method. The method isolates specific conversations within the traffic and processes messages according to said method. Refer to FIG. 13 for a flowchart illustrating said embodiment.

In one embodiment, the enclosed method is implemented within a given application. Said application generates self-describing messages according to a specific organization that produces many identical sets of metadata with identical ordering of said metadata within each of said sets. A hash of any instance of a particular set of metadata with said set in an identical order in each instance will be identical to any other such hash, hence there is no need for canonicalization to normalize said self-describing messages to detect said identical sets of metadata and thus detect repetition in communication of said sets of metadata. In another similar embodiment, a difference is that said application produces identical sets of metadata with differing ordering of metadata within each of said identical sets of metadata. In this embodiment, a hash derived from one such identical set might differ from that of another identical set because of different metadata organization within said other identical set. In this embodiment, a method of canonicalization is implemented to normalize the ordering of metadata, which thusly ensures that such hashes will match and repetition in communication of sets of metadata may be detected. In this embodiment such canonicalization is implemented immediately after the enclosed method separates a message's data from its metadata. A suggested method for XML canonicalization is specified by the World Wide Web Consortium in their document XML-C14N, "Canonical XML, Version 1.0". Suggested implementation of said method in an embodiment of enclosed method is with Java language class XMLC14N developed by Phaos Technology.

Information system security has been increasingly more important in recent years, as commercial and government infrastructure becomes more dependent upon these systems. Various attacks upon information systems, such as fast-spreading Internet worms and distributed denial of service, have shown the importance of detecting and countering attacks across networks. Distributed intrusion detection systems (D-IDS) have been developed to detect suspicious events and ultimately attacks based on traces that attackers left in a local network or across a wide area network [1, 2, 3, 4]. The topologies used for such systems vary, but in a simple case one can comprise one or more each of sensor, analyzer and manager components. Sensors may detect suspicious events by observing network traffic or host logs. Sensor's report such events to analyzers which may derive the importance of these through correlation of events throughout the distributed system. Managers coordinate DIDS activity, initiating action in response to attacks, and maintaining distribution of information throughout the system. How distributed intrusion detection systems exchange messages, especially alert messages, becomes one of the important problems in D-IDS research.

In a distributed environment, IDSs have to exchange alert messages within and amongst themselves in order to obtain distributed traces of attacks and formulate new attack information. The messages usually impose an overhead on network bandwidth. During attacks that generate high volume network traffic, the alert messages may worsen the bandwidth loading and thus reduce the performance of IDSs. In particular, this problem weakens the Intrusion Detection Message Exchange Format (IDMEF) [5], an IETF working Internet-draft for IDS communication.

Exchanging alert messages in IDMEF imposes a higher bandwidth overhead than other systems since IDMEF utilizes in one embodiment Extensible Markup Language (XML) for communications. XML is the current standard for describing protocols that allow distributed systems to communicate. XML Schema and XML tagging provide a means for detailed description within messages themselves, at the cost of the overhead of the description in the form of textual tags. In addition to allowing messages to describe themselves, as utilized by the disclosed system and method XML, the disclosed invention provides for a process and system for easily extending the protocol of the disclosed method to meet evolving needs, validity checking, and universal language handling, making it ideally suited for loosely-coupled communications, as needed in D-IDS. In spite of the various advantages, an XML-based communication protocol becomes an obstacle to promoting IDMEF due to its overhead, a limitation overcome by the disclosed invention.

The enclosed system and method signaling in one embodiment XMLDNR can be implemented for communications within a distributed intrusion detection systems (DIDS) which achieves decreased network bandwidth utilization and latency, as an example during periods of high DIDS messaging activity which would likely be accompanied by high network activity in general, comprised of normal traffic plus attack traffic. Intrusion Detection Systems (IDSs) are usually deployed within the confines of an organization. There is usually no exchange of information between an IDS in one organization with those in other organizations. The effectiveness of IDSs at detecting present-day sophisticated attacks would increase significantly with the disclosed inter-organizational communication and sharing of information among IDSs. We envision a global Internet-scale defense infrastructure as a working mileu for the disclosed invention.

The enclosed system and signaling in one embodiment XML-DNR can be implemented method to improve messaging efficiency within distributed intrusion detection systems, the use of which achieves decreased network bandwidth utilization and latency. Such improvements in efficiency, as an example, during periods of high DIDS messaging activity which would likely be accompanied by high network activity in general, comprised of normal traffic plus attack traffic, are critical for the continued functionality of a network. During such periods of high activity, a network might approach a saturation point where congestion would significantly impair or completely negate the usefulness of that network.

During such periods of high activity, a network might approach a saturation point where congestion would significantly impair or completely negate the usefulness of that network.

In such a scenario, a DIDS would effectively be subverted into a cause of network impairment as a result of the attack. To reduce the risk of such subversion, it is critical that a DIDS optimize its use of bandwidth. While such a scenario also implies that the DIDS is implemented in-band (where DIDS-specific messages, such as intrusion event alerts or malicious traffic signature updates, are intermingled on the same network with any and all other network traffic on the monitored network), an out-of-band DIDS (where DIDS-specific traffic is communicated over a separate physical or virtual network from the monitored network) could also be at risk of exhausting limited out-of-hand network resources, and would thus benefit from bandwidth optimization.

The disclosed system and method signaling in one embodiment XMLDNR is valuable for any communication where metadata structure is repeated in communication between particular entities. Examples of systems which exhibit such repetition include DIDSs, instant messaging systems, multi-player networked games, and geographic information systems. XML is the prevalent contemporary metadata language, and so XMLDNR was named after it, however the XMLDNR method is applicable to any metadata language, especially to those whose tags can grow large in proportion to the data elements that they describe. SGML, Open XML, and other subsets are viable embodiments of the disclosed system and method. All manner of metadata, i.e. data about data, can be compacted conserving the kilobytes of bandwidth per message, i.e. the data transfer capacity, or speed of transmission, of a digital communications system as measured in bits per second (bps) is achieved by the disclosed invention Implementation The enclosed system and method signaling comprises in one embodiment the XMLDNR methodology for two example areas within the distinct layers of a network communication, as illustrated in the ISO OSI stack Short for International Organization for Standardization Open Systems Interconnection reference model. A layered architecture (plan) that standardizes levels of service and types of interaction for computers exchanging information through a communications network. The ISO/OSI reference model separates computer-to-computer communications into seven protocol layers, or levels, each building—and relying—upon the standards contained in the levels below it. The lowest of the seven layers deals solely with hardware links; the highest deals with software interactions at the application-program level. It is a fundamental blueprint designed to help guide the creation of networking hardware and software. The International Standards Organization Open Systems Interconnection is similar to the TCP/IP stack, where the upper three layers are condenced from Application, Presentation and Session to simply Application Layer, and where lower two layers are condenced from the Data Link and Physical to simply the Network Access Layer. We refer to the popular TCP/IP stack for the sake of simplicity, in FIGS. 12 and 13.

In the first area, the application layer implementation [FIG. 12], the application is aware of the disclosed methodology utilizing XMLDNR and explicitly implements it, decomposing and recomposing messaging signaling, calculating and comparing signalling hashes, and negotiating with participating nodes. Is understood that the disclosed system and method will work with SGML, the acronym for Standard Generalized Markup Language. An information management standard adopted by the International Organization for Standardization (ISO) in 1986 as a means of providing platform- and application-independent documents that retain formatting, indexing, and linked information. SGML provides a grammar-like mechanism for users to define the structure of their documents and the tags they will use to denote the structure in individual documents.

An alternative application layer implementation has the application calling routines from an XMLDNR library, which would optionally perform each of the before-mentioned signalling functions independently as requested by the application, or would take a request from the application in the form of a message and the recipient's network address, and would process said message according to the XMLDNR protocol.

The application can run discreetly without further direction from the application transparently.

Optionally the disclosed system and method can return a status of the communication to the application.

In the second area, the transport layer implementation [FIG. 13.], the application is completely unaware of the use of XMLDNR. An XMLDNR protocol driver for the enclosed method is installed on top of the operating system or virtual machine, and related networking components of either. Said XMLDNR protocol driver listens for metadata-encoded messages as traffic is passed down the network stack.

Complete messages are either observed in their entirety in one embodiment.

or stored and assembled, in alternative embodiments. XMLDNR hash comparisons are performed and when the protocol of the disclosed method is deemed useful by the driver a negotiation message is sent to the communicating participating nodes, followed by either the normal message or XMLDNR abbreviated message as determined by any response or lack thereof by the communicating participating nodes.

Disclosed XMLDNR Achievements Over OTHER TECHNOLOGY

Achievements of the disclosed system and method beyond GZIP and other text-stream compression is achieved. The disclosed system and method utilizing XMLDNR compares favorably against text-stream compression methods because it narrows down on exactly the level that repetition occurs in the domain of repeated structure-and-participant XML communications. In one robust embodiment, the disclosed system and method focuses on the SGML in one case XML metadata structure, and tokenizes it without regard to syntax. In so doing, it achieves a ratio of compression similar to the size of the token, which is the metadata's hash, compared to the size of the structure. While GZIP and other such compression methods can provide attractive compression ratios for repetitive textual data, they are not suited for detecting or exploiting repetition of message structure where messages are separated by time and do not occur in communication as single textual documents, streams or exhibit similar cohesion. This being the case, such compression technologies are blind to the messaging repetition that the enclosed method exploits, a distinct achievement of the disclosed invention. Further, it is practical to augment use of the enclosed method with the use of a GZIP-type compression applied to textual data resulting from compression by the method. This is especially true where such textual data would yield benefits from GZIP-type compression in any case.

Tokenizers

Compression methods that examine a language for syntax, and create tokens for often-used words can achieve a high level of compression compared to text-stream compression methods. However, tokenizers must spend a great deal of processing power studying a language for repetition in order to create a dictionary of tokens, and must keep the messaging participants in sync with regard to that dictionary. The disclosed system and method utilizing XMLDNR achieved superb results comparative to such tokenizers because it is much more simple, using a single token per conversation (the hash of the metadata structure). Also, XMLDNR does not require much setup between participants, making new participant node-to-participant relationships possible quickly and automatically.

APPLICATION EMBODIMENTS

Discussion of Cell Phone Network Embodiment (See FIG. 15.)

Referring to FIG. 15, entity 170100 represents a computing device acting as a server providing application services to cell phones and other mobile computing devices. Such services might be offered in the form of a web application server accepting requests in HTTP protocol for HTML or WML formatted documents. 170100 might be connected to a wireless network of mobile computing devices, including cell phones, through a networking device, in the form of a network bridge and/or switch, represented by 170200. The link 170400 between 170100 and 170200 might be a T1 circuit, or they might be connected directly using an Ethernet network. Other intermediate network devices have been omitted for clarity and do not impact the use of the invention or vice versa. 170400 carries traffic between 170100 and all devices 170300, 170310 etc, which must simultaneously contend for bandwidth over both 170400 and also possibly the wireless medium at 170500, 170510 etc.

Still referring to FIG. 15, a multitude of cell phones represented by 170300 and 170310 (the quantity of cell phones represented as 1 through n, where n is an arbitrary number) is connected to the communications infrastructure represented by 170200 across a wireless connection using any given wireless protocol capable of allowing reliable network traffic between cell phones and 170200. The required network bandwidth for any given set of self-describing messages is greatly reduced for network traffic between devices 170300, 170310 etc and 170100, and thusly reduces the required bandwidth capacity of links 170400 and 170500, 170510 etc.

DIDS (Distributed Intrusion Detection Systems): Discussion of Distributed Intrusion Detection System Embodiment (See FIG. 16.)

In one embodiment and implementation of the disclosed system and method a sensor would communicate with a given analyzer(s) due to the security and efficiency of their network connection to each other. It is often the case that during a given period of time when a particular attack is being conducted within the observance of an intrusion detection system, intrusion detection messages exhibit repetition of the same message structure. For example, a computer on a network might attempt to connect to the same TCP port of each computer within a subnet, which might cause a DIDS sensor to generate an alert message for the connection attempt with each target computer. Such messages would likely have identical metadata, and the message timestamp, target computer address and TCP port number might be the only differing data portions between messages.

Referring to FIG. 16, entity 180100 represents a computing device acting as an analyzer of intrusion detection event alerts delivered from DIDS sensors, represented by 180300, 180310 etc. DIDS sensors analyze available network traffic or other pieces of available information from a network or host computing device, and when such examined information is deemed interesting because of a signature match against a known sample of malicious information or by some other criteria, information about the event is communicated to the analyzer.

180100 might be connected to other DIDS components, including sensors, through a network device in the form of a network switch or router, represented by 180200. The link 180400 between 180100 and 180200 might be a T1 circuit, or they might be connected directly using an Ethernet network. Other intermediate network devices have been omitted for clarity and do not impact the use of the invention or vice versa. 180400 carries traffic between 180100 and all devices 180300, 180310 etc, which must simultaneously contend for bandwidth over both 180400 and also at a potential bottleneck connection to 180200.

The required network bandwidth for any given set of self-describing DIDS messages is greatly reduced for network traffic between devices 180300, 180310 etc. and 180100, and thusly reduces the required bandwidth capacity of links 180400 and 180500, 180510 etc. This also increases available bandwidth for traffic other than DIDS traffic, especially during periods of high DIDS-related traffic.

In one embodiment and implementation of the disclosed system and method a sensor would communicate with a given analyzer(s) due to the security and efficiency of their network connection to each other. A sensor would not likely communicate ad hoc with various other DIDS components. Likewise, following the DIDS hierarchy, an analyzer would communicate with a given DIDS manager(s).

The enclosed method implemented in conjunction with an intrusion detection system reduced the required bandwidth necessary to communicate alert messages. An observed example was for an alert message sent by the sensor to an analyzer upon detection of a well-known attack known as the Ping of Death. Standard for the sensor, the message was formatted as described by the IDMEF specification. The IDMEF message size was 1097 bytes. The enclosed method decomposed the message and generated a set of metadata for the message which was 807 bytes in size, including placeholders. The MD5 hash representation of that message was 857403e85c4d721c076d2dacd58c809d. The method generated a set of delimited data for the message, which consisted of 28 fields of data, and the size of said set of delimited data was 346 bytes. FIG. 18 illustrates an example of an XML-encoded IDMEF message, including metadata and data as in 18(*a*), which would normally be communicated in it's entirety, contrasted with what would be substituted by a hash using disclosed method as in 18(*b*), and the kernel data that be communicated using the disclosed method as in 18(*c*). The whole message as illustrated in FIG. 18(*a*) was taken from the IDMEF specification as published by the IETF IDWG at ietf.org.

Benefits Derived Through Embodiment of Disclosed Method in Cell Phone Network (See FIG. 17.)

Referring to FIG. 17. The network links illustrated in 190300 in one embodiment of disclosed method comprise a packet switched 3rd generation cell network, characterized by wireless digital data signals which are packet-switched as compared with circuit-switched wireless networks which lack the flexibility and cost-savings of packet-switching. Said packet-switched network can handle 10 Mb per second peak rate of wireless network traffic between various network devices and a cell tower 190400. 190400 provides network access to provider services at provider's network 190600, and Internet 190700. In said embodiment, typical packets transmitted across the network without application of disclosed method are 5000 bits in size. In said scenario, typical usage is 2000 packets per second, supporting perhaps 1000 devices.

Use of the disclosed method in said scenario reduces packet size and required bandwidth by 70%, resulting in said network's ability to handle 6666 packets per second. Said improvement enables said network to support perhaps 3333 devices, an extra 2333 devices illustrated by 190200, linked to cell tower 190400 via links 190300. In terms of potential additional revenue in a hypothetical revenue scenario, said improvement by 2333 subscribers who have $25 per month subscriptions to provider of said network's service would realize $58 K per month more income per month per distribution point.

Further Specifications of Method

The disclosed system and method utilizes a procedure of, in one embodiment, XMLDNR to achieve bandwidth-saving for system compacting XML-encoded messages. The disclosed system and method recognizes the repetition of metadata between communicating partners and enables further communication of such metadata to be abbreviated to an MD5 hash, 16 bytes in length, one embodiment. Where metadata previously may have consumed kilobytes of bandwidth per message, the disclosed system and methods use of XMLDNR reduces that consumption to 16 bytes. The cost of using XMLDNR is the processing power to create hashes and conduct hash comparisons, plus the additional network handshaking to enable the protocol of the disclosed method between partners. A final implementation of the disclosed inventions' process is that it can be transparent to non-enabled communicators.

The disclosed system and methods utilization of XMLDNR is so-named because of the current prevalence of XML as a metadata language, however, the XMLDNR technique may be applied to any messaging that utilizes a metadata language that incorporates element tags. XML stands for eXtensible Markup Language. It is a language for defining other languages, and as such allows protocols to be developed and standardized that enable clear and concise communications between heterogeneous systems. XML Schema provides a means to define namespaces particular to domains of subject systems. Through the extensibility inherited from XML, such protocols can adapt to respond to changing communications needs. These qualities are valuable enough to justify the use of XML, which also has an inherent weakness from a telecommunications point of view, the need to transmit textual tags that can consume more bandwidth than the data described by the tags themselves, a limitation overcome by the disclosed invention.

Benefits achieved by the disclosed system and method are flexibility and interoperability, web services, Client/server and application to application communications for any metadata. The disclosed system and method can be utilized in DIDS and IDMEF to achieve heterogeneous the disclosed system and methods use of XMLDNR security important for a global network, for embodiments such as Cellular telecommunications with cell phones, as well as trunk lines.

The disclosed system and method of the XMLDNR technique for example comprises three phases: (1) decomposing the metadata enclosed messages into metadata and data (step 020200 in FIG. 2, and as described herein); (2) determining whether a message meets the requirements to have the protocol of the disclosed method used for its transmission (step 020500 in FIG. 2, and as described herein), and if so, negotiating with the receiving entity on the protocol of the disclosed method's use (steps 020700 and thereafter in FIG. 2, as described herein); (3) recomposing the message at the receiving end of communications into the original metadata encoded message data (step 025100 in FIG. 2, as described herein).

Decomposing and recomposing a message from/into its data and metadata portions is for example performed by a function from a metadata library, such as libxml in the case of XML, being used on a Unix/Linux platform. The function performs parsing of the metadata structure, which in the case of XML involves recursively examining each branch in the document tree until each leaf is found, as disclosed by the invention.

Negotiation can be conducted with loose or tight coupling of participants in alternative embodiments of the disclosed invention. Loose coupling involves participants that have no previous relationship or knowledge of one another's XMLDNR capability, which necessitates more negotiation overhead bandwidth over the network connection. Tight coupling involves participants that negotiate their capabilities at a connection level, and maintain a long lasting connection over which many conversations can take place, each utilizing XMLDNR with minimal negotiation, and this minimal network overhead. Tightly coupled participants maintain knowledge of one another's hash table, and thus a knowledge of when to simply send a metadata structure's hash instead of relying on negotiation for that determination by the disclosed invention.

Three robust example alternative embodiments of XMLDNR communication:
1 Application layer
2 Network transport layer
3 Device implemented hardcoded circuit.
Each embodiment can incorporate loose or tight coupling.

Illustration of High-Level Abstraction of
Multipurpose Method (See FIGS. 1(*a*). and 1(*b*).)

This flowchart represents an abstract description of the method applicable to a multiplicity of embodiments.

Decompose Phase

Step 010100

Start of method. A self-describing message, comprising data encapsulated using descriptive tags, is presented to a system implementing the enclosed method.

Step 010200

The message data is separated from its metadata. Placeholders are inserted into the metadata describing the location of each piece of data, for the ultimate recomposition of the message into its form as presented to the method. Similarly, a delimiter is used to demark the start and end of each piece of data once it has been separated from its metadata. Also produced in this step is a hash of the metadata with placeholders.

Step 010400

The metadata with placeholders is stored with its hash, for use in recomposing the message to its form as presented to the method.

Step 010420

The delimited data is accompanied by the hash of its corresponding metadata with placeholders, and may be utilized, stored or communicated.

Recompose Phase

Step 015100

A message comprising but not limited to delimited data and its metadata hash is presented to the method.

Step 015300

The hash is used to reference the metadata with placeholders, which is used to recompose the message to its original state before decomposition by the method. Data elements are parsed and are inserted into the metadata to replace their respective placeholders. Relation of data element to placeholder is accomplished based on sequence of respective placeholder within set of metadata, and sequence of data element within set of delimited data, these sequences matching as established during steps of decomposition. In another embodiment, relation between such placeholders and such data may be accomplished by storing an offset number indicating where within the metadata each item of data in the set of data should be inserted.

Step 015500

The message in its recomposed state is passed along for utilization, storage or communication.

Illustration of High-Level Abstraction of
Communication-Use Method (See FIGS. 2(*a*). and 2(*b*).)

This flowchart describes abstract usage of the method for communication of self-describing messages.

Sender

Step 020100

A self-describing message is presented to a system implementing the method.

Step 020200

The message data is separated from its metadata. Placeholders are inserted into the metadata describing the location of each piece of data, for the ultimate recomposition of the message into its form as presented to the method. Similarly, a delimiter is used to demark the start and end of each piece of data once it has been separated from its metadata. Also produced in this step is a hash of the metadata with placeholders.

Step 020400

A history of observation of the hash is examined to determine its frequency of use.

Step 020500

If frequency of use of the hash has reached a given threshold, use the method for the given message, otherwise skip use of the method and send the whole message to the recipient.

Step 020700

Negotiate with the recipient for receipt of message processed by the method, providing given message's hash of metadata with placeholders, and possibly the corresponding metadata with placeholders itself.

Step 020800

Upon failed negotiation, skip further use of the method for the given message at this time and send the whole message to the recipient.

Step 020900

Negotiation was successful, so send the delimited data and optionally also the corresponding hash of the metadata with placeholders to the recipient.

Recipient

Step 025100

A message comprising but not limited to delimited data and its metadata hash is presented to the method.

Step 025300

The hash is used to reference the metadata with placeholders, which is used to recompose the message to its original state before decomposition by the method.

Step 025500

The message in its recomposed state is passed along for utilization, storage or communication.

Illustration of High-Level Abstraction of
Storage-Use Method (See FIGS. 3(*a*). and 3(*b*).)

This flowchart describes abstract usage of the method for storage of self-describing messages.

Message Decomposition and Storage

Step 030100

Start of method. A self-describing message, comprising data encapsulated using descriptive tags, is presented to a system implementing the method.

Step 030200

The message data is separated from its metadata. Placeholders are inserted into the metadata describing the location of each piece of data, for the ultimate recomposition of the message into its form as presented to the method. Similarly, a delimiter is used to demark the start and end of each piece of data once it has been separated from its metadata. Also produced in this step is a hash of the metadata with placeholders.

Step 030400

The metadata with placeholders is stored with its hash, for use in recomposing the message to its form as presented to the method.

Step 030420

The delimited data is stored with the hash of its corresponding metadata with placeholders, and may be utilized, stored or communicated.

Message Recomposition

Step 035100

A message comprising but not limited to delimited data and its metadata hash is presented to the method.

Step 035300

The hash is used to reference the metadata with placeholders, which is used to recompose the message to its original state before decomposition by the method.

Step 035500
The message in its recomposed state is passed along for utilization, storage or communication.

Figure 4C:
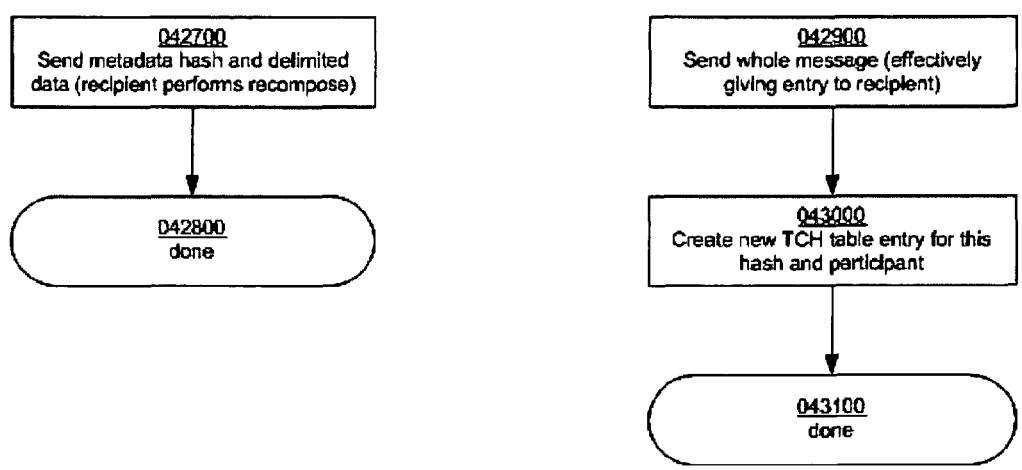

Flowchart Illustrating Method Usage for Tightly Coupled Application Layer Participants (See FIG. 4, showing participant communicators utilizing knowledge of each other's metadata hash tables, reducing need for negotiation; operating at the Application Layer.)

In one embodiment the FIG. 4. provides a description of an application-layer embodiment of system and method for compressing metadata-encoded messages. A computer application employs the invention to communicate with another application.

Step 040100
Application becomes ready to send a metadata-encoded message. Such a message comprises data elements encapsulated by metadata tags that describe their meaning to the recipient. The data elements themselves are encapsulated in metadata, to describe the metadata language in use, as well as the type of the message.

Step 040200
The method specifies a NODNR table that is maintained with identifiers of recipients that are known not to be capable of using the method. If a recipient system is known to be incapable of the method, then the method can be bypassed and the messaging process can be saved the overhead of the method. Step 0200 looks up this recipient in the NONDR table.

Step 040300
As per the disclosed system and method Was the recipient found in the NONDR table?

Step 040400
The recipient was found in the NONDR table. The whole message is sent to this recipient.

Step 040600
The message is processed (decomposed) to separate the metadata from the data. The separated metadata (SMD) is made to include placeholders that indicate sequentially where each data item belongs within the metadata. The separated data's (SDT) individual data elements are delimited with a control character that may not appear in the data.

Step 040700
A hash is generated based on the metadata of the message (SMD).

Step 040800
The MDS table is searched for an entry for the current hash.

Step 041000
This hash has no MDS table entry. An MDS entry is created for it which includes the hash, the SMD, a counter indicating how many times it has been used within the system, and a timestamp indicating its last use.

Step 041100
The whole message is sent to the recipient by the disclosed system and method.

Step 041300
The hash was found in the MDS table. The entry's counter is incremented and its last-used timestamp is set with the current date and time.

Step 041400
The MDS entry's counter is tested to see if it is past the threshold indicating the number of times seen before the XMLDNR method should be used for a metadata structure. The threshold is variable.

Step 041500
The usage count has not passed the threshold. The whole message is sent to the recipient.

Step 041700
An entry for this recipient and SMD hash is searched for in the tightly-coupled hash (TCH) table. The TCH table indicates that a given recipient already has a given hash, and that the initial steps of the XMLDNR negotiation can be bypassed for the given SMD hash and recipient.

Step 041900
A TCH entry either could not be found, or was found but was expired and the corresponding MDS entry could not confidently be expected to still exist at the recipient. An XMLDNR negotiation request is sent to the recipient for this message. The request includes the SMD hash for the current message.

Step 042000
The system waits for a response from the recipient.

Step 042200
If the recipient does not respond in a given period of time, that recipient is considered to be incapable of using XMLDNR, and the whole message is sent.

Step 042300
To avoid further attempts to use the method with the current incapable recipient, the NONDR table is updated with the recipient's identity. The NONDR table may be purged at given periods of time to allow the incorporation and use of the method for previously incapable recipients.

Step 042500
The recipient may respond with a message letting the system know that it did not understand the method's request. This condition is determined by the response being anything except an XMLDNR expected response. If the response is not understood within the method, then the recipient is considered incapable of XMLDNR and the whole message is sent.

Step 042700
The hash of the SMD along with the SDT data are sent to the recipient. The recipient performs recomposition of the message.

Step 042900
The recipient did not already have the MDS table entry, so the whole message is sent.

Step 043000
The recipient is expected to create an MDS entry based on the SMD for this message. A new TCH table entry is created for this recipient to be checked for future messaging that involves this SMD.

Figure 5B:
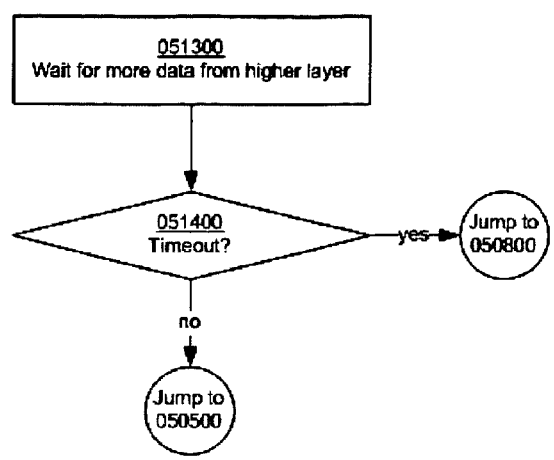

Flowchart Illustrating Method Usage for Tightly Coupled Network Transport Layer Sending Participants (See FIG. 5, showing participant communicators utilizing knowledge of each other's metadata hash tables, reducing need for negotiation; operating at the Network Transport Layer, observing data flow for message start and end; providing method for one or many endpoints.)

In one embodiment, the tightly coupled network layer embodiment is implemented below the application layer, and as messages are passed from the application layer towards lower network layers and ultimately to the network medium, the messages are processed according to the method. The network layer implements the method for one or many applications, and is completely transparent to the applications. Data sent from multiple simultaneous client applications is differentiated based on application identification at the time service is initiated between a particular client application and the method. The method is preferably implemented in the network stack before lower network layers. Refer to FIG. 13, for an example pertaining to Microsoft Windows networking where the method is placed as a Transport Driver Filter in the Transport Driver Interface (TDI). The TDI provides access to the transport networking layer. By implementing the method above the TCP layer in this example, TCP flow control need not be compensated for as the method potentially buffers data between opening and closing metadata tags while waiting for complete messages to process.

Step 050100

New data is passed down the network stack to the layer implementing the XMLDNR method.

Step 050200

Test for whether an opening metadata tag is present in data.

Step 050300

If no tag is detected, the data can be passed through down to the next lowest layer of the network stack.

Step 050500

The method attempts to find the corresponding closing tag for the current message. If such a closing tag is detected, the message is processed according to the next steps of the method in FIG. 4, step 040200.

Step 050600

No closing tag is detected, so data must be stored until a closing tag is found, or until the buffer fills, or until a given time period has elapsed. The buffer is checked for its fill level, to see if it can accommodate current data.

Step 050800

Buffer would be overflowed, so move buffer data along with current data to a temp area, to be passed to lower layer.

Step 050900

Flush the buffer. The previously buffered and current data will be passed to the lower network layer.

Step 051000

Send current data to buffer

STEP 051100

Wait for more data to be passed down from higher network layer. Method is anticipating that a closing tag will arrive.

Step 051200

If no data arrives within a given timeout period, the buffer is sent down through the network. If data does arrive in time, it is checked for the presence of a closing tag and processing restarts from STEP 050500.

Figure 6B:
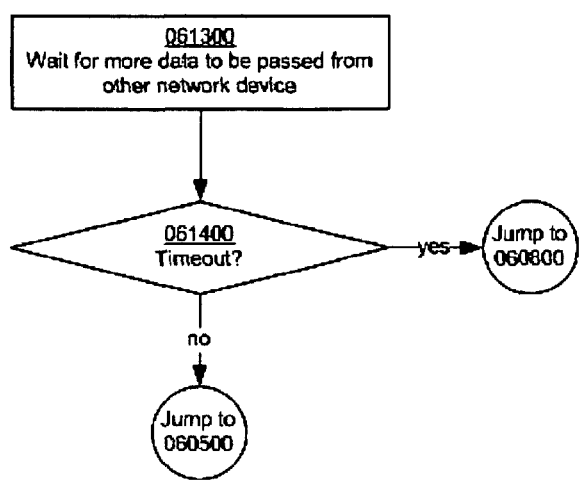

Flowchart Illustrating Method Usage for Tightly Coupled Circuit Type Sending Participants (See FIG. 6, showing participant communicators dedicated to implementation of the disclosed method, operating independently from other devices as standalone black boxes; providing method for one or many endpoints.).

The tightly coupled circuit embodiment is standalone, and is implemented outside the computing device or network device. After messages have been passed onto the network medium, they are processed according to the method. The circuit embodiment implements the method for one or many applications, and for one or many computers or devices on an internal network residing on the internal side of the circuit. It creates a virtual tunnel or tunnels across a network medium with one or more peer circuits which also implement the method in conjunction with the given circuit. Messages passed through the tunnel benefit from use of the method. Usage in this embodiment is conducted with the independence of the computers, devices and applications on the internal and external networks with the exception of peer circuits implementing the method in conjunction with a given circuit. This flowchart illustrates the method as implemented for a single network connection between two ultimate endpoints. In the circuit environment, the method is implemented to include handling of multiple simultaneous connections based on the particular internetworking and transport protocols in use by the network clients. For example, when implemented within a TCP/IP environment, the method would identify distinct network connections based on source and destination IP address and TCP or UDP port numbers. Distinct packets including packet header information is recomposed before the method completes processing a message and forwards such packets to their destination.

Step 060100

New data is passed through the network to the circuit.

Step 060200

Test for whether an opening metadata tag is present in data.

Step 060300

If no tag is detected, the data can be passed through down to the other circuit endpoint.

Step 060500

An opening tag was detected, therefore the system begins processing a message. The method attempts to find the corresponding closing tag for the current message. If such a closing tag is detected, the message is processed according to the next steps of the method in FIG. 4, step 040200.

Step 060600

No closing tag is detected, so data must be stored until a closing tag is found, or until the buffer fills, or until a given time period has elapsed. The buffer is checked for its fill level, to see if it can accommodate current data.

Step 060800

Buffer would be overflowed, so move buffer data along with current data to a temp area, to be passed to lower layer.

Step 060900

Flush the buffer. The previously buffered and current data will be passed to the lower network layer.

Step 061000

Send current data to buffer

Step 061100

Wait for more data to be passed down through the network to the circuit. Method is anticipating that a closing tag will arrive.

Step 061200

If no data arrives within a given timeout period, the buffer data is sent to the other circuit endpoint. If data does arrive in time, it is checked for the presence of a closing tag and processing restarts from STEP 060500.

Figure 7B:
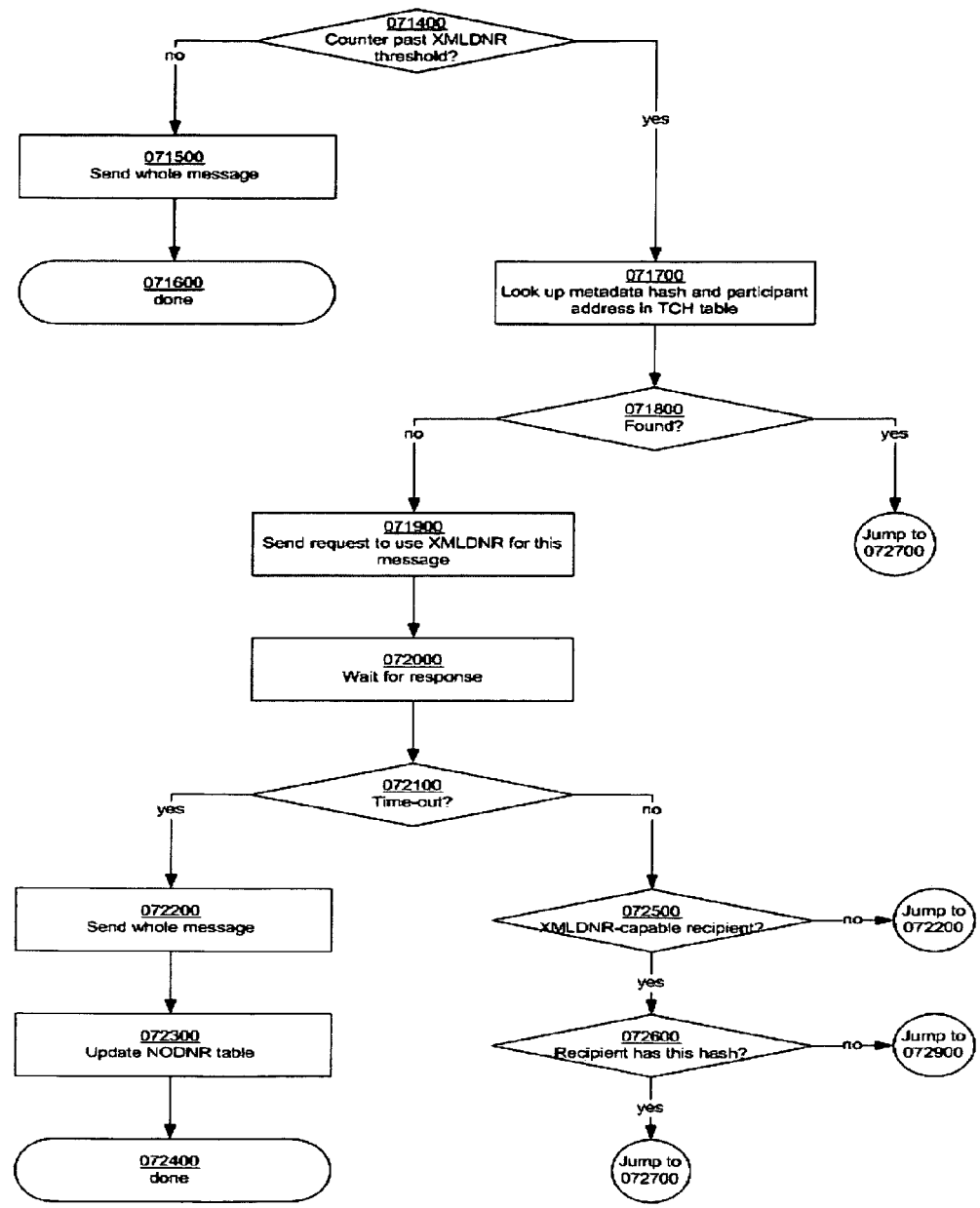
Figure 7C:
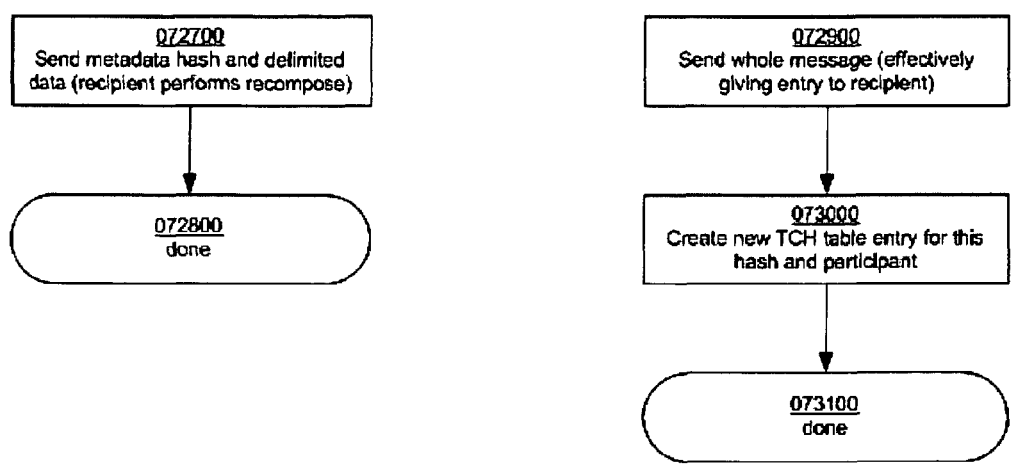

Flowchart Illustrating Method Usage for Tightly Coupled Circuit Type Participants after Receiving Entire Message (See FIG. 7, showing participant communicators dedicated to implementation of the disclosed method over a circuit; description of action taken upon detection of a whole message.)

In a robust tunnel embodiment with a circuit processing of complete message, is discussed herein. This section of the disclosed system and method is an alternative embodiment to FIG. 4, with the a difference being that the recipient is not aware of XMLDNR. The endpoint here is disclosed as a fixed one, a statically defined and paired tunnel endpoint, with the recipient accessible on the network anywhere after the other endpoint. This embodiment typifies a use of the method for communication trunk lines. Trunks are fixed in infrastructure, and as such are convenient to implement with tight coupling since their endpoints are static and usually dependent upon one another in configuration. Trunk lines carry aggregated traffic from various sources. When such traffic is similar in nature and metadata structures often repeated, for example many cell towers aggregating mobile device instant messaging traffic to one gateway device and then connecting that gateway device to a network backbone, it is well-suited for compression using the enclosed method.

Interesting to this embodiment, which is implemented by observing network traffic from the lowest portion of the OSI stack, is that it must observe traffic from distinct network conversations between participants in an isolated fashion apart from other such conversations whose traffic may be interspersed within said distinct traffic. The flowchart describes the method implemented for a distinct stream, which in one embodiment may be isolated based on source and destination network addresses and source and destination transport layer addresses (known as ports).

Step 070100

Data received at circuit from network device on internal network. This data is passed to the circuit which acts as routing endpoint for an XMLDNR compression tunnel through which the data is ultimately forwarded to the peer circuit, and on to the recipient.

Step 070200

The data is analyzed to detect the presence of an opening metadata tag, which defines the beginning of a metadata-encoded message.

Step 070300

No opening tag was detected, so pass this data to the endpoint for delivery to the ultimate recipient.

Step 070500

An opening tag was detected. Analyze this data for the presence of a corresponding closing tag. A positive detection here indicates that a whole message is present in this data. If there was a positive detection, jump to the processing method for a metadata-encoded message from FIG. 4, step 040200.

Step 070600

No closing tag was detected, so the method must store the data received from the point of the opening tag until a closing tag is detected.

Step 070700

A hash is generated based on the metadata of the message (SMD).

Step 070800

The MDS table is searched for an entry for the current hash.

Step 071000

This hash has no MDS table entry. An MDS entry is created for it which includes the hash, the SMD, a counter indicating how many times it has been used within the system, and a timestamp indicating its last use.

Step 071100

The whole message is sent to the recipient.

Step 071300

The hash was found in the MDS table. The entry's counter is incremented and its last-used timestamp is set with the current date and time.

Step 071400

The MDS entry's counter is tested to see if it is past the threshold indicating the number of times seen before the XMLDNR method should be used for a metadata structure. The threshold is variable.

Step 071500

The usage count has not passed the threshold. The whole message is sent to the recipient.

Step 071700

An entry for this recipient and SMD hash is searched for in the tightly-coupled hash (TCH) table. The TCH table indicates that a given recipient already has a given hash, and that the initial steps of the method's negotiation can be bypassed for the given SMD hash and recipient.

Step 071900

A TCH entry either could not be found, or was found but was expired and the corresponding MDS entry could not confidently be expected to still exist at the recipient. An XMLDNR negotiation request is sent to the recipient for this message. The request includes the SMD hash for the current message.

Step 072000

The system waits for a response from the recipient.

Step 072200

If the recipient does not respond in a given period of time, that recipient is considered to be incapable of using the method, and the whole message is sent.

Step 072300

To avoid further attempts to use the method with the current incapable recipient, the NONDR table is updated with the recipient's identity. The NODNR table may be purged at given periods of time to allow the incorporation and use of the method for previously incapable recipients.

Step 072500

The recipient may respond with a message letting the system know that it did not understand the method's request. This condition is determined by the response being anything except an XMLDNR expected response. If the response is not understood within the method, then the recipient is considered incapable of the method and the whole message is sent.

Step 072700

The hash of the SMD along with the SDT data are sent to the recipient. The recipient performs recomposition of the message.

Step 072900

The recipient did not already have the MDS table entry, so the whole message is sent.

Step 073000

The recipient is expected to create an MDS entry based on the SMD for this message. A new TCH table entry is created for this recipient to be checked for future messaging that involves this SMD.

Figure 8B:
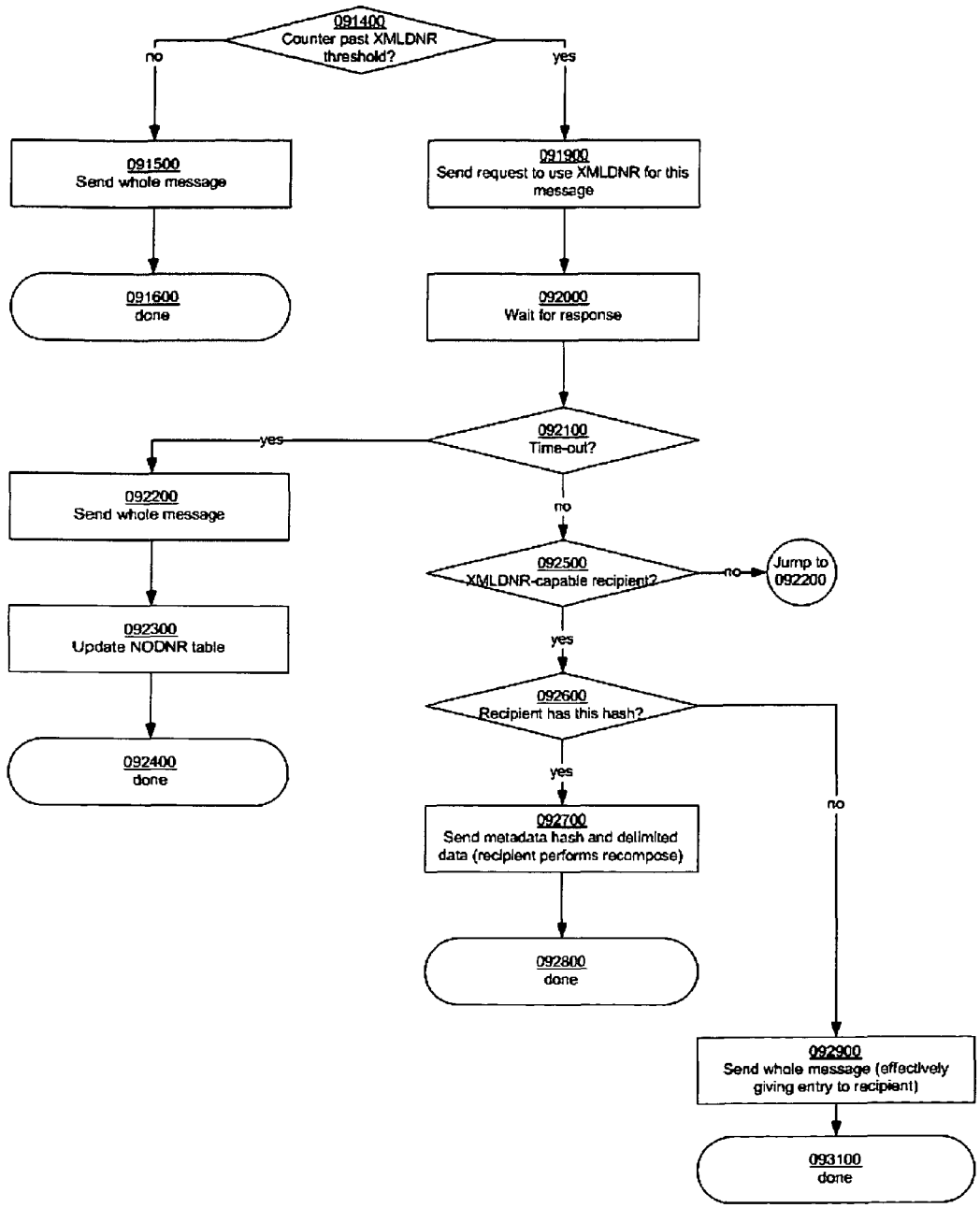

Flowchart Illustrating Method Usage for Loosely Coupled Application Layer Participants (See FIG. 8, describing method employment where communicators do not necessarily both have capability of method, or knowledge of each other's hash tables; operating at the Application Layer.)

Employing loose coupling between communicating participants allows less dependence on the stability of said participants with regard to their maintaining memory of hashed metadata structure information. More network communication is needed to implement the method using loose coupling versus that of tight coupling, and such overhead may be appropriate for some environments.

Step 090100

Application becomes ready to send a metadata-encoded message. Such a message comprises of data elements encapsulated by metadata tags that describe their meaning to the recipient. The data elements themselves are encapsulated in metadata, to describe the metadata language in use, as well as the type of the message.

Step 090200

The method specifies a NODNR table that is maintained with identifiers of recipients that are known not to be capable of using the method. If a recipient system is known to be incapable of the method, then the method can be bypassed and the messaging process can be saved the overhead of the method. Step 030200 looks up this recipient in the NONDR table.

Step 090300

Was the recipient found in the NONDR table?

Step 090400

The recipient was found in the NONDR table. The whole message is sent to this recipient.

Step 090600

The message is processed (decomposed) to separate the metadata from the data. The separated metadata (SMD) is made to include placeholders that indicate sequentially where each data item belongs within the metadata. The separated data's (SDT) individual data elements are delimited with a control character that may not appear in the data.

Step 090700

A hash is generated based on the metadata of the message (SMD).

Step 090800

The MDS table is searched for an entry for the current hash.

Step 091000

This hash has no MDS table entry. An MDS entry is created for it which includes the hash, the SMD, a counter indicating how many times it has been used within the system, and a timestamp indicating its last use.

Step 091100

The whole message is sent to the recipient.

Step 091300

The hash was found in the MDS table. The entry's counter is incremented and its last-used timestamp is set with the current date and time.

Step 091400

The MDS entry's counter is tested to see if it is past the threshold indicating the number of times seen before the XMLDNR method should be used for a metadata structure. The threshold is variable.

Step 091500

The usage count has not passed the threshold. The whole message is sent to the recipient.

Step 091900

The usage count has passed the threshold, so an XMLDNR negotiation request is sent to the recipient for this message. The request includes the SMD hash for the current message.

Step 092000

The system waits for a response from the recipient.

Step 092200

If the recipient does not respond in a given period of time, that recipient is considered to be incapable of using the method, and the whole message is sent.

Step 092300

To avoid further attempts to use the method with the current incapable recipient, the NONDR table is updated with the recipient's identity. The NODNR table may be purged at given periods of time to allow the incorporation and use of the method for previously incapable recipients.

Step 092500

The recipient may respond with a message letting the system know that it did not understand the method's request. This condition is determined by the response being anything except an XMLDNR expected response. If the response is not understood within the method, then the recipient is considered incapable of the method and the whole message is sent.

Step 092700

The hash of the SMD along with the SDT data are sent to the recipient. The recipient performs recomposition of the message.

Step 092900

The recipient did not already have the MDS table entry, so the whole message is sent.

Figure 9B:
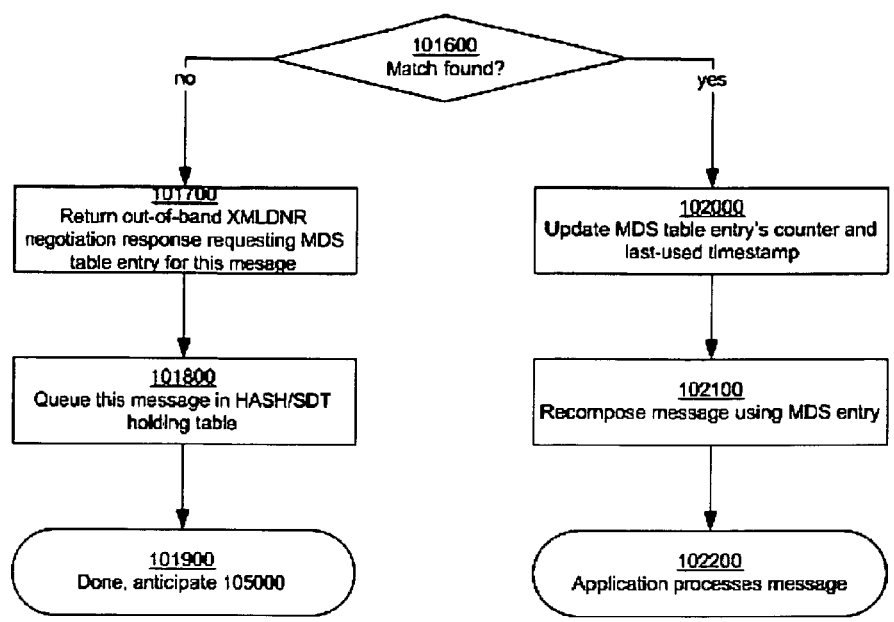
Figure 9C:
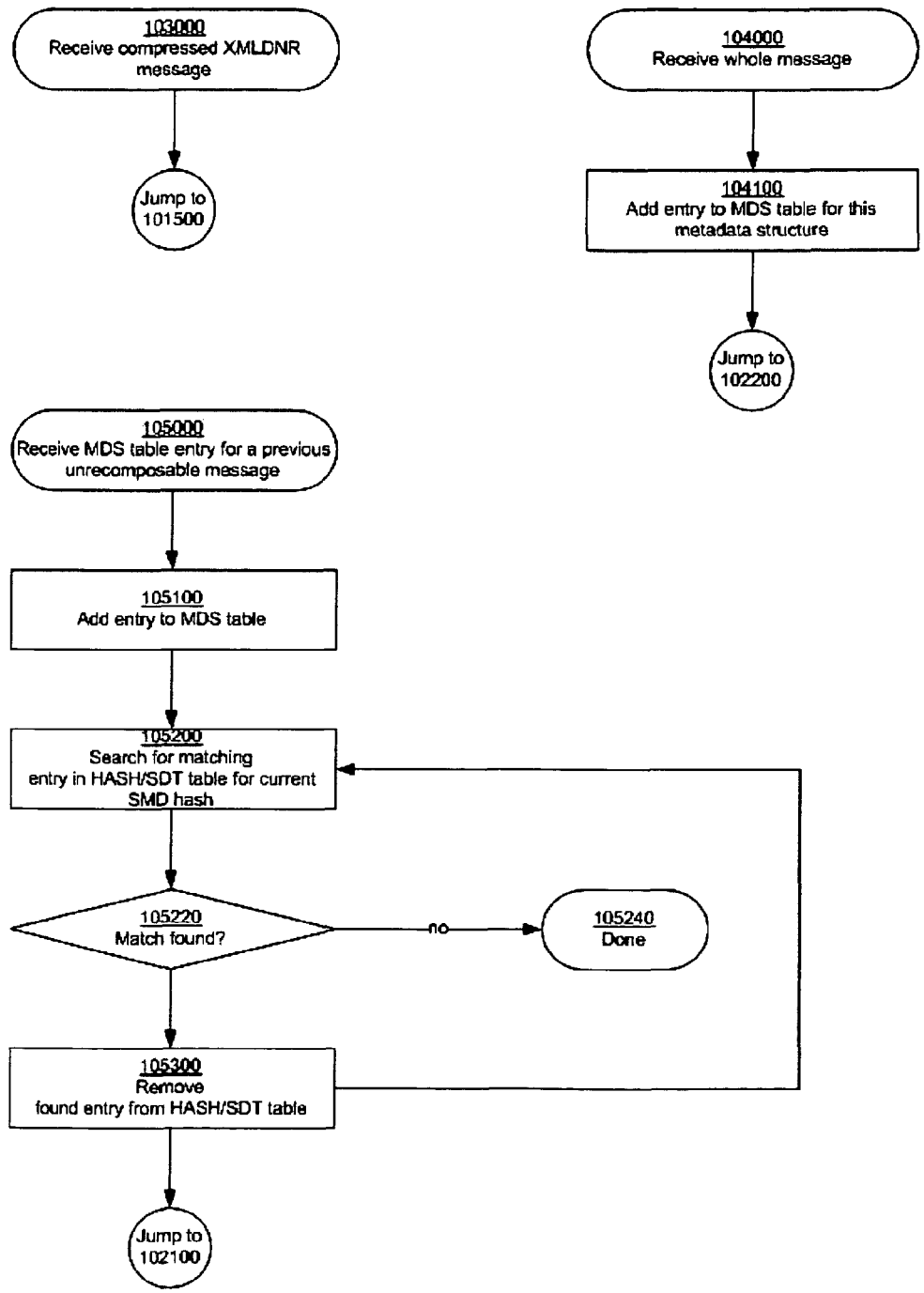

Flowchart Illustrating Method Usage for Recipients (See FIG. 9, describing processing performed by recipient of negotiation and message according to disclosed method; describes use of method in a communications system.)

Described below, in the disclosed invention for the recipient-side processing

Step 100100

An XMLDNR negotiation message is received by the recipient. The message includes a hash corresponding to an SMD entry in the MDS table.

Step 100200

The MDS table is searched for the current hash.

Step 100400

No corresponding entry is found, so the recipient returns a negotiation response requesting the whole message. This step anticipates step 104000.

Step 101000

A corresponding entry is found in the MDS table, so a request is sent to the sender requesting the compressed version of the current message.

Step 101100-101300

REMOVE? DEFINE

Step 101400

A compressed XMLDNR message is received. It includes the SMD hash and the SDT data.

Step 101500

The hash is searched for in the MDS table.

Step 101700

If a match is not found, then an out-of-band request must be sent to the sender requesting the whole message. This situation could occur if the recipient lost its MDS entry for a given message.

This step anticipates step 105000, where an out-of-band MDS message (table entry containing hash and SMD) will be returned to the recipient, enabling the recipient to process the SDT in the HASH/SDT table that has been buffered while waiting for the appropriate MDS message.

Step 101800

The compressed XLMDNR message (including the hash and the SDT) is stored in a holding area. It is held until the corresponding MDS entry is received, enabling further processing of the data. Anticipate step 105000.

Step 102000

An MDS entry was found. Increment its counter and set its last-used timestamp with the current date and time.

Step 102100

Recompose the original message using the MDS entry and the SDT, plugging SDT data elements into the SMD to replace its placeholders.

Step 102200

Pass the recomposed message to the application for processing.

Step 103000

A compressed XMLDNR message is received. Jump to step 101500 for standard processing of XMLDNR messages (hash plus SDT etc).

Step 104000

Receive whole message.

* Parse message *

* search MDS table for previous entry based on current hash * and add an entry to MDS table for this metadata structure. Jump to step 102200 to process whole message (no recompose needed in this case because it was received whole)

Step 105000

Receive MDS table entry in response to a previous request based on a previously received un-recomposable message (hash and SDT received with no SMD data already on recipient).

Step 105100

Add entry to MDS table.

Step 105200-105300 (For Each Entry in HASH/SDT Table With Hash Matching the Hash of the Current MDS Entry, for Which There Can Be Multiple Matches)

Step 105200

Locate entry in HASH/SDT table for current hash.

The disclosed system and method can optionally skip processing.

Step 105220

If a matching entry was found, this indicates a set of data has been stored in said Hash/SDT table for which no matching MDS was available. MDS received in step 105000 does match this Hash/SDT entry, and can be used to recompose message.

The disclosed system and method can optionally skip processing.

Step 105240

No matching entry was found, done processing Hash/SDT entries for current metadata hash.

Step 105300

Remove entry in HASH/SDT table for current hash. Jump to STEP 102100 to continue processing message.

Relation of data element to placeholder is, in one embodiment, accomplished based on sequence of respective placeholder and data element, or by other disclosed means.

Jump to STEP 102100 to continue processing recomposition of current message from SDT found in STEP 105220 and MDS received in STEP 10500.

Also return to search of Hash/SDT table for more matching entries for current metadata hash.

Discussion of Message Size Reduction (See FIG. 10.)

FIG. 10. illustrates the structure of a self-describing message, and the structure of the data portion, excluding metadata, of same after having been processed by the disclosed method.

Discussion of Embodiment—General Computing Device (See FIG. 11.)

Referring to FIG. 11, the embodiment comprises a computing device 120100, where executable software stored in memory 120101 is loaded into a central processing unit 120103 via a bus 120102 and executed. Some executed instruction may pertain to reading and writing information via a bus 120104 to/from a network interface 120105. Through such a network interface the computing device may communicate with other network or computing devices.

Discussion of Embodiment—Software Embodiment at Application Layer (See FIG. 12.)

Referring to FIG. 12, items 140100, 140200, 140300 and 140400 represent layers of software that implement a network stack. Such software may be loaded from memory into execution on a central processing unit as described herein related to FIG. 11. Item 140100 represents an application program which utilizes software that implements functions pertaining to operation of the disclosed method 149120. Such a program, as well as XMLDNR functions, may utilize generic XML parsing functions 149100. Such utilization may be performed using system calls to API libraries, and exact implementation may vary by the operating system of a given computing or network device.

Abbreviations

The disclosed term Separated Metadata as used herein is abbreviated to SMD. SMD refers to a given message's set of metadata, excluding data, along with placeholders indicating sequentially where data elements belong within said metadata.

The disclosed term Metadata Structure table as used herein is abbreviated to MDS. MDS refers to a table containing data entries, each of which comprises a metadata hash, an SMD, a counter to indicate the number of times said metadata hash has been observed by the method, and a timestamp indicating when said entry was last updated. The disclosed method utilizes the MDS table to reference MDS entries based on corresponding metadata hash values.

The disclosed term Tightly Coupled Hash table as used herein is abbreviated to TCH. ICH refers to a table containing data entries, each of which comprises a recipient addresses, a metadata hash.

The disclosed term Separated Data as used herein is abbreviated to SDT. SDT refers to a set of data comprising data elements, and a delimiter signal occurring one or more times within the set of data, to mark the location of each data element in said set of data. The delimiter signal must not exist in said set of data. Optionally, said delimiter can be tested for in the set of data and temporarily replaced by a signal that itself does not exist in said set of data.

The disclosed term Hash/SDT table as used herein is defined as a table optionally used within the disclosed method, in embodiments where communicators are loosely coupled. Loosely coupled recipients risk receiving one or more XMLDNR messages comprised of a metadata hash and a set of delimited data, for which said recipient has no metadata hash reference to the set of metadata stored in its MDS necessary for the disclosed method to recompose said message. The recipient optionally uses the Hash./SDT table as temporary storage for such received XMLDNR messages, the hash/SDT table entries each comprising a metadata hash, an SDT and a timestamp.

The disclosed term NODNR refers to a messaging recipient as having a status, from the point of view of a sending communicator, of being ineligible to receive messages processed by the XMLDNR method for one or more reasons. Such reasons include said recipient having not been able to conduct successful XMLDNR negotiations with said sender.

Note About Control Characters

In one robust embodiment of the disclosed system and method, the invention disclosed allows a control signal, comprising a special character, a character not used within the given metadata language, or some other distinguishable character to act as a placeholder for data elements within separated metadata entries (SMD). In an example where the method is used in conjunction with XML metadata, the tilde "" is one acceptable control character.

Similarly, a control signal is used as a delimiter between data elements in separated data entries (SDT). An XML reserved character, such as '<', '>', '&' and '%' are acceptable data delimiters for use with the disclosed method as said method pertains to use with XML formatted self-describing messages, because their use within such messages' data is governed by the rules of XML, providing a certainty that such characters appearing within such messages' data must be distinguishable from the data and therefore are able to be distinguished from data delimiters in use by the disclosed method.

The disclosed system and method achieves a hash-based methodology called XML Decompose-Negotiation-Recompose (XMLDNR), in one embodiment to solve the bandwidth overhead problem in IDMEF. To accomplish this, the disclosed system and method for each XML based message is decomposed into structure and data, and the unique MD5[6] checksum of the structure is computed and stored in one robust embodiment. The hash of each message's set of metadata is compared to those stored to recognize repetition, and if repetition over time surpasses a given threshold the complete message is used to request negotiation so that subsequent messages between the two members will exclude the message's set of metadata, comprising that particular set of metadata's hash and the set of delimited message data. The disclosed system and method, in one embodiment with XMLDNR effectively reduces the bandwidth overhead for IDMEF message exchange.

One achievement amongst many of the disclosed XMLDNR will benefit the IDS community by providing a bandwidth-saving alternative to exchanging alert messages among D-IDS. In the next section, we will provide background information on D-IDS, IDMEF and XML. Section 3 will describe the proposed XMLDNR protocol of the disclosed method. Section 4 will show our results of implementing XMLDNR with Snort in a tested environment and evaluate the performance of our protocol of the disclosed method during a hypothetical high-volume attack.

Distributed Intrusion Detection Systems (D-IDS)

To define the IDS terminologies to be used in one embodiment comprise detectors/sensors as components in IDS that are responsible for gathering activity interesting to the disclosed system and method. Analyzers are responsible for processing the data supplied by the detectors and concluding its level of likelihood of being an intrusion. Managers are responsible for coordinating the results from the analyzers and concluding whether a distributed attack has been detected, and launching communications and action responses. While these roles are conceptually separate, they may reside within the same software or hardware. They may also reside in separate areas within a locality, such as a single system or network, or may be required to communicate across wider boundaries. Inter-module communication is also disclosed for optimum use of valuable wide-area bandwidth.

The disclosed system and method IDSs detect intrusion events by either specific attack signatures as well as anomalous behaviors. A disclosed system and method D-IDS identifies an attack by correlating multiple intrusion events or aggregating related events from other D-IDS. Depending on the type and location of the detector, events may be in the form of: matches of network, disk or other data in memory to established signatures; mismatches of attempted access to system resources or networking metrics against established baselines to constitute anomalous activity. The previous concise explanation details the various embodiments of IDS categories of network and host-based platforms, and signature and anomaly types of detection as multiple robust embodiments for the disclosed invention. The disclosed invention comprises high-volume adaptable messaging as applicable to any and all types of IDS components of a D-IDS.

The messaging schemes used within a D-IDS and its members are utilized to achieve effectiveness. Selection of unnecessary message recipients wastes network resources, while omission of recipients could render the detection of attacks useless, limitations overcome by the disclosed system and method. Aggregation of messages saves network resources, but may not provide enough information for coordination of an effective response. At the sensor level, each event by the disclosed invention generates a message for its related analyzer, which results in high messaging traffic through periods of high positive event detection, for the disclosed invention. Optimizing bandwidth use helps ensure that pertinent information and critical message recipients are not omitted because of network limitations, an achievement of the disclosed invention.

A brief review of the taxonomy of attacks that can be detected by an IDS[7] and consideration of the resulting messaging reveals the achievement of the efficient use of bandwidth by the disclosed invention. DoS and DDoS attacks exhibit high traffic volume, which results in high message volume at the sensor level. The communication overhead among D-IDS thus becomes a pressing issue for defending against DDoS attacks [8]. Worms may attack each target with a low traffic volume, but may generate high traffic volume depending on how many targets they attack, which in turn generates high traffic volume towards the analyzer and management levels of a D-IDS. Even the detection of stealthy attacks, which are not characterized by high traffic volume in the attacks themselves, require an exhaustive number of events to be analyzed for correlation, the communication of which results in high traffic volume.

Alternative embodiments of the disclosed invention can robustly achieve the goals of a D-IDS determining the types and placement of its members, and the messaging scheme it employs. Research has yielded many D-IDS architectures[1, 2, 3, 4, 9], and their designs notwithstanding, message size optimization would be beneficial within them all achieved by the disclosed invention's robust system and method.

How D-IDS sensors communicate with each other efficiently and securely are important issues to the success of D-IDS. The disclosed system and method can implement and incorporate orchestration algorithms [4, 9].

IDMEF

The disclosed system achieves with IDMEF as a standard in connection with the IETF, and because of its comprehensive, flexible and secure characteristics. IDMEF is a working draft of the Intrusion Detection Work Group (IDWG) of IETF. It defines the content of messages going between IDS modules or from one IDS system to another. It comprises two main classes of message, the heartbeat and the alert, which are extensible and can be used to describe the gamut of intrusion events.

The IDWG has also provided Intrusion Detection Exchange Protocol[10] (IDXP), a framework for the secure coordinated communication of IDMEF messages between IDS members. Authentication and encapsulation for messaging between members is accomplished within the BEEP[10, 11] framework using a Transport Layer Security (TLS) profile[11].

IDXP, BEEP and related protocols are considered part of the lower transport levels. Their functionality for secure efficient transport is considered in one embodiment of the disclosed method.

While its XML-based structure provides a flexible and interoperable platform for messaging, the most inherent problem with the suitability of IDMEF for D-IDS is the bandwidth required for XML overhead, an achievement overcome by the disclosed invention. XML text tags compose a large portion of transmitted messages. Since the volume of messages could be high, and the bandwidth between some members could be relatively low, compacted message size is an important achievement of the disclosed invention.

One robust environment uses a structured protocol like IDMEF along with a compact messaging protocol underneath which can compact message size by examining message patterns, which helps optimize use of network bandwidth. A system where frequently-used structures are identified, compacted and the resulting structures synchronized for use between communicators is achieved in the following disclosure.

XML-Based Protocols

XML is the current standard for describing protocols that allow distributed systems to communicate. XML Schema and XML tagging provide a means for detailed description within messages themselves, at the cost of the overhead of the description in the form of textual tags. In addition to allowing messages to describe themselves, XML also has provisions for easily extending the protocol to meet evolving needs, validity checking, and universal language handling, making it ideally suited for loosely-coupled communications, as needed in D-IDS. In spite of the various advantages, XML-based communication protocol becomes an obstacle to promote IDMEF due its overhead. These advantages are suited for distributed intrusion detection systems (D-IDS). Whereas IDS systems are designed to detect and expose various types of attacks upon computers and networks, a distributed network of IDS systems is designed to extrapolate attack information from the data supplied by its members and potentially coordinate a response.

The successful disruption of computer operations on a global scale from fast-spreading malicious code is proof that defensive mechanisms need to be improved. As the use of D-IDS systems expands to meet the challenge of detecting and defeating a larger domain of attack types, within a larger scope requiring interaction outside of administrative boundaries and proprietary constraints, their level of messaging flexibility must also increase. D-IDS members will likely be constituted from a heterogeneous mix of platforms, device types, detection techniques, vendors and organizations, to create a powerful coordinated base of detection and response.

Adaptation of the messaging protocol to manage the system, and describe and respond to future attacks will be necessary as a D-IDS grows and attack methods change. Maximum messaging efficiency will be desired to mitigate the risk of network and D-IDS failure due to congestive D-IDS communications. The universality and adaptability requirements of D-IDS communications have been addressed well using XML-based protocols, and is achieved by the disclosed invention.

The network traffic issues related to XML have been addressed by standards organizations and solutions providers in the form of research into compression schemes, optimization hardware and XML-ready network architecture[12]. The disclosed invention will become ubiquitous for XML-based paradigms like web services Compression schemes have been adopted with reluctance because of the processing overhead they incur. Optimization hardware is expensive and excels in XLT translation, which is advantageous for human-readable display versus communications between automated systems. Modified network architecture is expensive to institute, especially over expensive wide area networks.

A compression scheme with a low processing cost and high message size reduction would be the most attractive near-term solution for achieving messaging efficiency. A protocol for XML message compression based on message decomposition, negotiation between communicators, and recomposition one of several achievement of the disclosed invention achieves an elegant solution to the problem of XML message size. The disclosed system and methodology works with established communication schemes, including the IDMEF [5]/IDXP[10] scheme outlined by the IETF. It can also work within other D-IDS schemes, and more generally can be used where any XML messaging takes place involving repeated structures and high traffic.

XML Decompose/Negotiation/Recompose (XMLDNR)

The abbreviation of repeated elements is achieved by the disclosed inventions compression schemes. The scope of data examined for repetition determines how the compression is implemented. The scope used in XMLDNR, for example, is the examination of messages over time. In one embodiment, the XML structure of each message is examined to determine how the structure is repeated in its entirety over time.

To accomplish this, each message is decomposed into structure and data, and, in one embodiment, the unique MD5 checksum of the structure is computed and stored. The checksum of each message is signaled, as well as compared to those stored to recognize repetition, and if repetition over time surpasses a given threshold the complete message is used to request negotiation so that subsequent messages between the two members will exclude the message's set of metadata, comprising that particular set of metadata's hash and the message's set of delimited data.

Repetitious Messaging

In one embodiment, the XMLDNR system and method protocol disclosed reduces required messaging bandwidth conditionally, so when those conditions are met the XMLDNR protocol is applied, otherwise messages simply bypass use of XMLDNR. The conditions are that: (1) multiple messages are generated between the same two members; and (2) a large number of those messages share the same structure.

A message distribution list or algorithm is for example, used to select members to contact. For the purposes of analyzing the XMLDNR protocol in one embodiment, it is shown that a member consistently selects the same member(s) to contact. Robustly, the communication comprises sensor-to-analyzer, analyzer-to-manager, manager-to-manager, signal to signal, node to node and can be customized. Manager-to-manager communication is the type of communication more often to exhibit changes in communicating members depending on the type of message or distribution algorithm, but repeated communication between particular pairs of members can still be anticipated and addressed by the disclosed invention. So based on the general operation of D-IDS communication, condition (1) will be satisfied. It may be that certain attacks that do not satisfy (1) directly, however message relays, signaling between members could also satisfy (1), since member A might have to pass messages destined for members C, D, E and F through member B.

It is a common characteristic of widespread attacks to exhibit repeated attempts to exploit a particular vulnerability or probe in a particular way. For instance, the same file access violation may be detected for multiple files, or a system's TCP/IP application suite may be attacked in attempts to exploit one or more vulnerabilities, or certain ports may be intermittently scanned. In such cases, alert messages typically contain the same pieces of information, with changes only in the instance values. Therefore the message structures are repeated in their entirety, which will satisfy (2) of the disclosed system and methods XMLDNR requirements, in one robust embodiment.

XMLDNR Procedure

The disclosed system and method in one embodiment incorporating XMLDNR hashes IDS alert messages as the messages pass through the standard IDMEF encoding mechanism. FIG. 19. shows the XMLDNR message table for a IDS in one embodiment. The IDMEF structure excluding data is hashed using the MD5 algorithm to create a unique signature for signalling. The 128-bit signature is checked against ID fields in the table. If the signature is found, the counter for that ID is incremented and LASTUSED is updated. Otherwise, an entry is added to the table for the message. In the case where the ID is found, if SENTCOUNT is past a given threshold, a change occurs in the usual IDMEF exchange with the inclusion of messages from the XMLDNR protocol in this sequence of events: (1) IDXP is used to request a message table exchange for current ID; (2) The recipient acknowledges having that ID, or requests it, signaling; (3) The message table record for that ID is sent if requested; (4) A C-IDMEF message is sent with the current ID and the current data in delimited form.

As part of system housekeeping, the C-IDMEF message table is trimmed of entries with LASTUSED older than a given threshold. This function could be accomplished during the lookup of ID in the message table for new events. FIG. 20 shows the XMLDNR message fields.

XMLDNR, in one embodiment fits into a messaging scheme at the point where an XML message has been composed and is ready for transmission from the application layer. Using a complete XML message as a starting point, versus higher level integration during message composition, enables XMLDNR to operate within any messaging system that can support a plug-in for message conditioning, a robust modular application of the disclosed system and method.

Benefits

An achievement of using the disclosed invention signaling with XMLDNR is that it significantly decreases the bandwidth used in XML messaging, for example. In the next section, we will show results from two XMLDNR schemes, one with no compression and the other with a compression scheme using zlib[13]. Our tests show that the no compression scheme has reduced message size greater than 60% and the achieve with the invention compression scheme can reduce the message size and signaling even further.

Since processor utilization is another limiting factor in messaging, the application of compression techniques may not be practical if system performance degrades. The disclosed invention achieves signaling with XMLDNR signals with processor utilization is relatively low. Therefore achieving significant effects with the disclosed inventions XMLDNR can be accomplished without degrading system performance significantly.

The disclosed invention's XMLDNR protocol layer can be self-contained and can be inserted into any XML messaging stack. It has low processing overhead and because it tests for repetition before being applied, it does not affect network traffic unless its benefits can be realized.

The costs of implementing the disclosed invention's XMLDNR can comprise of: the storage space for the message table, 16 bytes for the checksum plus roughly 800 bytes for XML structure per entry plus 2 bytes for a counter plus 2 bytes for timestamp; computation of the MD5 checksum for each message examined; sort and search of the message table for each message; negotiation with recipient to set up XMLDNR for a particular message structure as well as signaling, in one embodiment.

Analyzing the performance of XMLDNR under laboratory conditions for example in one robust embodiment for the disclosed invention can be implemented on a computer with the Linux OS as an attack target and sensor, running the SNORT[14] IDS enhanced with the SNORT IDMEF plug-in [15]. The IDMEF plug-in was modified to include an implementation of the disclosed invention's XMLDNR protocol. The Libxml2[16] library was used to conduct a basic parse of the IDMEF messages, the OpenSSL[17] MD5 library was used to compute the checksum, zlib was used for extra compression, and qsort and bsearch libraries were used in working with the message table. qsort and bsearch are functions provided with the GNU C programming language, qsort allowing an array to be sorted, and bsearch allowing a sorted array to be searched. In addition, under conditions of several conducted attacks and a simple port scan probe to a target computer using NMap[18] from a separate computer. A known type of attack is the Malformed UPnP Advertisement. During our experiments, we found that such a UPnP-type event was recursively triggered due to a false positive from a device on the local network.

Reductions in Message Size and Bandwidth

Summarization of the invention's achievements in one embodiment are shown in FIGS. 21-24. The bandwidth cost of negotiating the XMLDNR conversation signaling is not included in these results because it is insignificant in proportion with the savings during high traffic conditions.

The first two entries in FIG. 21 come from the application of the disclosed invention's XMLDNR signaling upon sample data supplied within the IDMEF draft. The subsequent entries indicate the results of network testing. FIG. 21 shows that XMLDNR achieved a 60%-67% reduction in message size (33%-40% of its original size). FIG. 22 translates message size reduction into an indication of bandwidth savings based on the frequency of messaging experienced during testing.

Further Reduction With zlib

The invention's implementation of C-IDMEF messages in our preceding examples comprise a structure-identifying checksum, and a payload comprising the delimited data portion of the original message signaling in one implementation. Said delimited data is also referred to as C-IDMEF message data, or C-IDMEF message payload. Since the C-IDMEF message data is textual, and a good choice for further compression, tests were also conducted using zlib on said payload. FIGS. 23 AND 24 show the corresponding results from further compression. FIG. 23 shows that the XMLDNR compression achieved a 76%-79% reduction in message size (21%-24% of its original size).

Message compression is but one achievement of the disclosed inventions implementation of XMLDNR. One invention comprises of a SNORT/IDMEF sensor alone, alternative embodiments entail added message recipients for signalling.

Another achievement of the disclosed inventions system and method, implementing the computational costs of the XMLDNR process for signaling amongst nodes were too small to be registered using the Gnu library's clock( ) function [19], having a cost of less than the granularity of its $\frac{1}{100}^{th}$ of a second of CPU time measurement unit.

High-Volume Effectiveness

An achievement of the disclosed invention is to have a significant impact on network bandwidth utilization when high-volume messaging is needed. In this case, the reduction in message size signaling allows for more communications before bandwidth becomes over-saturated. We would like to provide several examples illustrating the disclosed invention's impact.

The Sasser worm attempts to generate a large amount of network traffic during certain points in its behavior cycle[20, 21] with infection attempts at 512 communications sessions per second. The W32.SQLExp worm attempts to spread[22] using UDP, and can send packets out more quickly than by using TCP. On a 100 Mbs link it could theoretically transmit attempts to communicate with 23,041 unique hosts per second.

In lieu of having the exact size of the Sasser and W32.SQLExp IDMEF alert messages that SNORT would presumably generate, let us estimate them to be within the low range of our samples, at 1046 bytes original, 368 bytes compressed with XMLDNR only. Let us further presume that the worm propagation technique was extremely successful, and was able to transmit its detectable signature with each communication attempt, and that our disclosed system and methods sensor was able to detect each event and generate an alert message signal for another member of the D-IDS to process. The resulting alert message rate, which does not include lower layer overhead, for a single Sasser-infected computer in our scenario would be greater than 4 Mbs. The same for a single W32.SQLExp-infected computer would be greater than 192 Mbs. With a 65% reduction in size, the same message rates would be reduced to 1.4 Mbs and 67 Mbs respectively in one embodiment.

The disclosed system and methods implementation as XMLDNR enables a specialized form of compression that is a significant achievement under certain conditions for signaling as described earlier, a unique characteristic of the disclosed invention.

An achievement and difference between XMLDNR and other methods of compression, in one embodiment, is that the disclosed system and method relies on its memory of previously used structures, while remaining independent of their semantics. Character-based compression techniques, like zlib, are not aware of the repeated use of encapsulating structures in messages over time. Awareness of the data based on DTD or XML Schema can maximize its compression, as seen in other solutions like XMill[23], but such schemes incur higher processor cost than the achievements of the disclosed invention, implemented in one embodiment as XMLDNR, and tend to have benefits when compressing bodies of XML greater than 20 KB. Typical IDS messages encountered in this study is and example of around 1-2 KB.

Another unique achievement of the disclosed system and methods signaling and use of XMLDNR is its use of negotiation in discovering and exploiting repeated structures. This feature may incur some extra networking cost that is regained through the effectiveness of the protocol's invention being implemented. The flexibility in allowing the disclosed inventions process to adapt to the changes in messaging without the need for tuning makes it easier to manage than protocols where communicators use pre-shared compression schemes.

The disclosed system and method achieves an alert message compression protocol for distributed intrusion detection systems in one robust embodiment amongst others, signaling XML Decompose-Negotiation-Recompose (XMLDNR). An example implementation utilizing the disclosed invention's process of in one embodiment XMLDNR in a lab environment by plugging with Snort running on a Linux system. The disclosed invention implementation of XMLDNR signaling can, in one embodiment achieve reduced message size to less than 30% of its original size. Under Sasser and W32.SQLExp worm scenarios, the disclosed invention's embodiment as XMLDNR achieved reduced alert messages from 4 Mbs and 192 Mbs to 1.4 Mbs and 67 Mbs, respectively.

The disclosed system and method achieves in one robust embodiment XMLDNR as part of the overall strategy used to optimize messaging in D-IDS. The disclosed invention can be used with IDMEF or XML-based structures like IDMEF, where structures are repeated due to similarity of events and consistency in communicating member pairs of a system.

In addition, The disclosed system and method implementation as XMLDNR is for example, a protocol that increases the usability of XML in high volume messaging systems by greatly reducing message size in one embodiment. The outstanding benefit of XML as a universal language fostering interoperability and allowing heterogeneous systems to accomplish singular goals achieved and furthered using the disclosed invention's message optimizing XMLDNR embodiment. Implementing the disclosed invention is relatively low cost, in that it employs, in one embodiment, a simple MD5 checksum computation and a search and sort of a limited table structure. The disclosed invention can be tuned to be transparent when low traffic conditions exist, and is flexible in its independence of the meaning within messaging signals such as those encompassing XML structures while being able to exploit their repetition.

Implementing the invention signaling as a D-IDS, with at least two message recipients, for example is achieved with SNORT and IDMEF and other D-IDS architectures as alternative embodiments disclosed to establish optimized computational and network impact during extremely high message volume, with limited impacts of latency during the disclosed inventions signaling XMLDNR communicator negotiation phase signaling.

The disclosed invention can exist as a wlan, nic lan adapter, internal nic, pc card adapter, Ethernet, token ring, structured wiring system, MTSO, thin client, Peer to peer network with or without a name, a server, a SAN, a MAN, circuit switched digital network, ISDN, packet switched network, ATM switch, as a browser plug in, a Web server plug in module, a home network, a financial transaction system, a medical information secure system and method, a Modem cpu as well as other robust embodiments.

The foregoing describes the invention in terms of embodiments foreseen by the inventor for which an enabling description was available, notwithstanding that insubstantial modifications of the invention, not presently foreseen, may nonetheless represent equivalents thereto.

I claim:

1. A computer-implemented system containing a non-transitory computer readable medium coupled to a processor, the processor operable to perform optimizing computer network bandwidth by reducing the necessary bandwidth for metadata-encoded messages sent between and amongst nodes by replacing the metadata of a signal with a unique hash of said metadata comprising:

a metadata decompose negotiate recompose operation comprising:
 (a) a processor performing a decomposition of a self-describing message into at least two constituents, a set of metadata and a set of kernel data;
 (b) a processor performing a generation of a metadata hash derived from said set of metadata, said metadata hash acting as a compact replacement for said set of metadata through communication;
 implementing as a compared representative for a complete identification of identical sets of metadata;
 (c) a processor performing further analysis of a repetition of usage of any particular set of metadata over time;
 (d) a processor performing further negotiation between a network node sending a self-describing message and a network node receiving said message, and subsequent sending and receiving of said message, at said sender and said recipient respectively, in its entirety or in one or more parts of said set of metadata, said kernel data, said metadata hash; and (e) a processor performing a recomposition of a self-describing message to an initial form prior to said decomposition;

further an operation comprising a handshaking process by which a sending node signals to employ said metadata decompose negotiate recompose operation in the conversation, and by which a receiving node signals capability of using the method, and a subsequent initiation and use of the metadata decompose negotiate recompose operation comprising a storing of metadata hashes; implementing said metadata decompose negotiate recompose operation;

an operation determining the presence of metadata repetition between said sending node and said receiving node; and alternatively an operation detecting the presence of metadata repetition from said sending node irrespective of a receiving node.

2. The computer implemented system comprising an operation of claim 1 wherein the sending node is a non endpoint node, the receiving node is a non endpoint node and further wherein said sending endpoint node and said receiving node communicate to establish a virtual tunnel for a conversation for nodes other then said sending and said receiving nodes.

3. The computer-implemented system of claim 2 further comprising an operation wherein one of the communicating nodes is a cell phone.

4. The computer-implemented system of claim 1 comprising an operation wherein one of the communicating nodes is a multiplayer gaming system node.

5. The computer-implemented system of claim 1 further comprising an operation of a canonicalization of the metadata structure prior to creating a hash.

6. The computer-implemented system of claim 1 further comprising an operation wherein said metadata decompose negotiate recompose renegotiate operation is implemented using a program executed on a processor other than a central processing unit of the computing node or a networking device node.

7. A non transitory computer readable medium coupled to a processor, the processor operable to perform for optimizing computer network bandwidth by reducing the necessary bandwidth for metadata-encoded messages sent between and amongst nodes by replacing the metadata of a signal with a unique hash of said metadata of claim 1 further comprising: a storage of said self-describing message.

8. The system of claim 1 further wherein said self-describing message comprises a metadata structure canonicalized prior to creating a metadata hash derived from said set of metadata; and said self-describing message is stored comprising a set of kernel data; a set of metadata; a metadata hash derived from said set of metadata.

9. A computer-implemented method for optimizing computer network bandwidth reducing the necessary bandwidth for signaling comprising at least one or more metadata-encoded messages comprising a set of metadata and a kernal data sent between and amongst nodes in a network comprising said nodes by a system generated substitution of metadata with at least one of a signal comprising a hash wherein said hash comprises a substitution signal for a set of metadata decomposed from said metadata encoded messages for a set of metadata including one or more placeholders decomposed from metadata encoded messages; wherein said placeholders substitute for a location of kernel data of metadata encoded messages;

and a handshaking process signaling comprising a sending entity node signaling requests to employ metadata decompose negotiate recompose in a conversation on said network, and by which a receiving entity signals a participation in said handshaking process;

a sending entity node signaling initiation of said method; and a fallback to standard communications to recover comprising from any failure of said metadata-encoded messages;

a failure of said handshaking process comprising either a sending node or a receiving node with a detecting of a timeout; an error message, a handshaking process invalidity.

10. The system of claim 9 further wherein said handshaking process signaling comprising a receiving entity node signaling requests to employ metadata decompose negotiate recompose in a conversation on said network, and by which a sending entity signals a participation in said handshaking process;

a receiving entity node a signaling initiation of said method; and a fallback to a standard communications to recover from any failure of the method comprising either sending or receiving node detecting a timeout; an error message, a handshaking process invalidity.

11. A non transitory computer coupled to a processor programmed to generate efficient metadata comprising:

a metadata generated by a system comprising:

a compression source code segment comprising a self-describing source code;

a computer data metadata further comprising a system messaging as a D-IDS, Distributed Intrusion Detection System with two message recipients comprising at least one of an executable to detect network intrusions, an IDMEF Intrusion Detection Message Exchange Format, or a D-IDS Distributed Intrusion Detection Systems network architectures membership achieving bandwidth savings for message volume, with limited impacts during messaging communicator negotiation initiation further comprising a system messaging as a D-IDS, with at least two message recipients, comprising SNORT™, IDMEF, D-IDS network architectures ; and said system achieving limited network latency for a bloated message, with limited impacts of latency during messaging negotiation phase messaging networks said messaging networks further comprising:

a messaging to and from metadata of wireless local area network, a network interface controller local area network adapter central processor unit computer node, an internal network interface card on a computer node, a computer with a personal computer card adapter; an Ethernet, a Token ring, a structured wiring system, a browser, a Rich Site Summary feed syndication service; a Mobile Telephone Switching Office, a thin client, a peer to peer network with a name server, a peer to peer network without a name server, a System area network, a Metropolitan Area Network, a circuit switched digital network, an Integrated Services for Digital Network network, a packet switched network, an Asynchronous Transfer Mode switch, a central processor unit with a Browser plug in, a Web server plug in module, a web services enabled central processor unit, a home network, a financial transactions network, a radio network, a modem central processor unit circuit, or a medical data service.

12. A method of compressing data for network messaging, comprising:
   obtaining a metadata encoded message;
   decomposing an initial set of signals to obtain a hash for each signal in the initial set of relevant signals
separating out a set of metadata;
   determining a suitability of sending messaging based on repetition of a particular set of metadata in said metadata encoded message comprising data structures;
performing a calculation on said set of metadata comprising at least one of a cryptographic hashing function further comprising at least a hash value based on an input further comprising wherein said input is said set of metadata
performing a calculation on said set of metadata signals to obtain a hash;
   comparing the hash for at least two of the messages compared message-by-message in said initial set of relevant signals;
   and transmitting said set of relevant signals based on the comparison of the hash.

13. A system comprising:
   a server connected to a network, the server securely receiving hash comparisons from users via the network, the server including: at
   least one processor;
a storage memory comprising of
   database of a network corpus of
   signals;
a memory operatively coupled to the processor, the memory storing program instructions that when executed by the processor, causes the processor to:
generate an initial set of relevant signals from a network corpus of signals comprising data structures;
obtain a hash based on a set of metadata for each
signal in the initial set of relevant signals;
   compare the hash for at least two of metadata encoded messages in the initial set of relevant signals; and transmit the set of relevant signals based on the comparison of the hash.

14. The system of claim 13 further wherein implementing at an application layer calling routines from a-metadata decompose negotiate recompose library.

15. The system of claim 13 further wherein perform each of said signaling functions independently as requested by the application; receiving a request from the application in the form of a message and a recipient's network address, to perform said metadata decompose negotiate recompose protocols.

16. The system of claim 13 further wherein a status of the communication is signaled to the application.

17. The system of claim 13 further wherein said system at a transport layer implements with the application independent of the use of said—metadata decompose negotiate recompose further comprising an metadata decompose negotiate recompose protocol driver installed with an operating system;
   a virtual machine, and interrelates to networking components of said OS with an metadata decompose negotiate recompose protocol driver listening for metadata-encoded messages as traffic is passed down the network stack.

18. A non transitory computer readable medium storing instructions for causing at least one processor to perform a method
   obtaining an initial set of relevant messages comprising metadata from a network corpus of messages comprising data structures;
   compacting the initial set of messages to obtain a hash for each signal in the initial set of messages comprising metadata;
   comparing the hash for at least two of the data structures in the initial set of relevant messages comprising metadata;
   and transmitting the set of relevant messages comprising at least one of a metadata or a hash substituted for set of relevant messages metadata based on the comparison of said hash.

19. A computer-implemented method for optimizing computer network bandwidth by reducing the necessary bandwidth for metadata-encoded messages sent between and amongst nodes by replacing the metadata of a signal with a unique hash of set of metadata of said signal;
said method comprising:
   participating in a messaging system comprising transmission of self describing messages;
      decomposing an initial message comprising a set of initial data excluding metadata; a set of metadata; and a hash product of decomposition of said set of metadata;
   sending said hash of said set of metadata and said set of initial data excluding metadata to a participating recipient node which omits unnecessary repetition of said set of metadata;
   recomposing from said hash of said set of metadata and the set of initial data into said initial message;
   said recomposing comprising
   using said hash of said set of metadata as a reference to said set of metadata at recipient node;
      substituting in said reference set of metadata;
      said set of initial data corresponding to a placeholder signal in said reference set of metadata.

20. The computer implemented method of claim 19 further wherein comprising the steps of:
   receiving a message said message comprising
      invoking a method for messaging comprising
         receiving a self-describing message from a signal;
         said self describing message
comprising a set of data, comprising zero or more data items, a metadata item
   comprising at least one of a starting tag, ending tag; a metadata versioning element; a metadata for namespace; customizable elements; a kernel data decomposing at least one of several self-describing messages into constituents comprising a metadata constituent and the data constituent itself;
   generating a unique hash based on said metadata item;
   generating a control signal representing a placeholder substituting for the data items metadata of said initial message;
   generating a delimiting signal for parsing of data items within said data constituent.

21. The computer implemented method of claim 20 further wherein comprising the steps of:
   analyzing occurrences of repetition of usage of any particular whole structure of metadata over time;
   negotiating with a recipient for transmission of said hash and said data constituent itself as substitute for initial message;

said transmission further comprising said initial message; said hash; said set of metadata; said delimited data; a customizable element;
transmitting to a separate node a signal comprising said unique hash; said data
comprising data parsed from said initial message, at least one of a delimiter of data; field offsets, means for parsing said data,
said metadata, said control signal system generated placeholder symbol to identify data location in initial message; means for identifying fields in said data;
storing at least one of a decomposed message comprising the metadata; hash; one or more occurrences of the hash with data;
said decomposed message data comprising signaling comprising delimiters, an offset, a mapping;
recomposing said initial message from said hash; said delimiters of data; a field offsets; a mask; a customizable marker.

22. A non transitory computer readable medium coupled to a processor, the processor operable to perform optimizing computer network bandwidth by reducing the necessary bandwidth for metadata-encoded messages sent between and amongst nodes by replacing the metadata of a signal with a unique hash of said metadata
comprising:
a tight coupling metadata decompose negotiate recompose comprising:
(a) a decomposition of a self-describing message into at least two constituents, a set of metadata and a set of kernel data;
(b) a generation of a metadata hash derived from said set of metadata, said metadata hash acting as a compact replacement for said set of metadata through communication;
storage of said self-describing message,
implementing as a compared representative for a complete identification of identical sets of metadata;
(c) further analysis of a repetition of usage of any particular set of metadata over time;
(d) further negotiation between a network node sending a self-describing message and a network node receiving said message, and subsequent sending and receiving of said message, at said sender and said recipient respectively, in its entirety or in one or more parts of said set of metadata, said kernel data, said metadata hash; and
(e) a recomposition of a self-describing message to an initial form prior to said decomposition;
further comprising a handshaking process by which a sending node signals to employ said metadata decompose negotiate recompose operation in the conversation, and by which a receiving node signals capability of using the method, and a subsequent initiation and use of the -metadata decompose negotiate recompose operation comprising a storing of metadata hashes;
analyzing need of implementing said tight coupling metadata decompose negotiate recompose;
implementing said tight coupling metadata decompose negotiate recompose;
determining the presence of metadata repetition between said sending node and said receiving node; and
alternatively detecting the presence of metadata repetition from said sending node irrespective of a receiving node;
maintaining at a sending node a history of communications such that existence of said set of metadata at said receiving node can be predicted;
said set of metadata at said receiving node is predicted, sending
said hash of metadata and said set of kernel data;
a receiving node buffering said metadata hash and said set of kernel data where said receiving node has no corresponding
set of metadata based on said metadata hash, anticipating, a receipt
of said set of metadata from said sending node and;
a receiving node communicating to said sending node a request for said set of metadata based on said hash of said set of metadata.

23. One or more non transitory computer processor readable storage devices having processor readable code embodied on said processor readable storage devices, said processor readable code for programming one or more processors to perform a method for optimizing computer network bandwidth by reducing the necessary bandwidth for metadata-encoded messages sent between and amongst nodes by replacing the metadata of a signal with a unique hash of set of metadata of said signal, the method comprising the steps of:
participating in a messaging system comprising transmission of self describing messages;
decomposing an initial message comprising a set of initial data excluding metadata; a set of metadata; and a hash product of decomposition of said set of metadata;
sending said hash of said set of metadata and said set of initial data excluding metadata to a participating recipient node which omits unnecessary repetition of said set of metadata;
recomposing from said hash of said set of metadata and the set of initial data into said initial message;
said recomposing comprising
using said hash of said set of metadata as a reference to said set of metadata at recipient node;
substituting in said reference set of metadata;
said set of initial data corresponding to a placeholder signal in said reference set of metadata.

24. One or more non transitory computer processor readable storage devices having processor readable code embodied on said processor readable storage devices, said processor readable code for programming one or more processors to perform a method for optimizing computer network bandwidth by reducing the necessary bandwidth for metadata-encoded messages sent between and amongst nodes by replacing the metadata of a signal with a unique hash of set of metadata of said signal,
the method of claim 23 further comprising
the step of:
storing of said self-describing message.

* * * * *